US010109183B1

United States Patent
Franz et al.

(10) Patent No.: US 10,109,183 B1
(45) Date of Patent: Oct. 23, 2018

(54) INTERFACE FOR TRANSFERRING DATA BETWEEN A NON-ROTATING BODY AND A ROTATING BODY

(71) Applicant: Panosense, Inc., Menlo Park, CA (US)

(72) Inventors: Joshua Franz, San Francisco, CA (US); Riley Andrews, San Francisco, CA (US); Ryan McMichael, Mountain View, CA (US); Arthur Benemann, San Carlos, CA (US); Denis Nikitin, Campbell, CA (US)

(73) Assignee: Panosense Inc., Foster City, CA (US)

( * ) Notice: Subject to any disclaimer, the term of this patent is extended or adjusted under 35 U.S.C. 154(b) by 0 days.

(21) Appl. No.: 15/706,413

(22) Filed: Sep. 15, 2017

Related U.S. Application Data

(63) Continuation-in-part of application No. 15/487,044, filed on Apr. 13, 2017.
(Continued)

(51) Int. Cl.
*H04B 5/00* (2006.01)
*G08C 23/04* (2006.01)
(Continued)

(52) U.S. Cl.
CPC .......... *G08C 23/04* (2013.01); *H04B 10/1143* (2013.01); *H04Q 9/00* (2013.01); *H04Q 2213/1301* (2013.01)

(58) Field of Classification Search
CPC ............... H04B 5/0037; H04B 5/0081; H04B 10/1143; H04Q 9/00
(Continued)

(56) References Cited

U.S. PATENT DOCUMENTS 3,790,277 A 2/1974 Hogan
4,154,529 A 5/1979 Dyott
(Continued)

FOREIGN PATENT DOCUMENTS

EP 2410358 A1 1/2012
EP 2858204 4/2015
(Continued)

OTHER PUBLICATIONS

U.S. Appl. No. 14/462,075, filed Aug. 18, 2014, Pennecot et al., "Devices and Methods for a Rotating LIDAR Platform with a Shared Transmit/Receive Path," 55 pages.
(Continued)

*Primary Examiner* — Md Talukder
(74) *Attorney, Agent, or Firm* — Lee & Hayes, PLLC

(57) ABSTRACT

An interface for transferring data between a non-rotating body and a rotating body of a sensor assembly using a bidirectional communication link. For instance, the interface may include a first data transmitter coupled to the rotating body and configured to transmit first data signals representing sensor signals generated by the sensor assembly. A first data receiver is coupled to the non-rotating body and configured to receive the first data signals via a first wireless coupling. The interface further includes a second data transmitter coupled to the non-rotating body and configured to transmit second data signals. A second data receiver is coupled to the rotating body and configured to receive the second data signals via a second wireless coupling. In some instances, the first data signals may be transmitted using a first wavelength and the second data signals may be transmitted using a second, different wavelength.

18 Claims, 15 Drawing Sheets

Related U.S. Application Data

(60) Provisional application No. 62/440,671, filed on Dec. 30, 2016.

(51) Int. Cl.
*H04Q 9/00* (2006.01)
*H04B 10/114* (2013.01)

(58) Field of Classification Search
USPC .................................. 455/41.1, 41.2, 41.3
See application file for complete search history.

(56) References Cited

U.S. PATENT DOCUMENTS

| | | |
|---|---|---|
| 4,516,158 A | 5/1985 | Grainge et al. |
| 4,700,301 A | 10/1987 | Dyke |
| 4,709,195 A | 11/1987 | Hellekson et al. |
| 5,098,185 A | 3/1992 | Watanabe et al. |
| 5,202,742 A | 4/1993 | Frank et al. |
| 5,303,084 A | 4/1994 | Pflibsen et al. |
| 5,337,189 A | 8/1994 | Krawczyk et al. |
| 5,428,438 A | 6/1995 | Komine |
| 5,703,351 A | 12/1997 | Meyers |
| 6,046,800 A | 4/2000 | Ohtomo et al. |
| 6,115,128 A | 9/2000 | Vann |
| 6,778,732 B1 | 8/2004 | Fermann |
| 7,089,114 B1 | 8/2006 | Huang |
| 7,248,342 B1 | 7/2007 | Degnan |
| 7,255,275 B2 | 8/2007 | Gurevich et al. |
| 7,259,838 B2 | 8/2007 | Carlhoff et al. |
| 7,311,000 B2 | 12/2007 | Smith et al. |
| 7,361,948 B2 | 4/2008 | Hirano et al. |
| 7,417,716 B2 | 8/2008 | Nagasaka et al. |
| 7,544,945 B2 | 6/2009 | Tan et al. |
| 7,969,558 B2 | 6/2011 | Hall |
| 8,050,863 B2 | 11/2011 | Trepagnier et al. |
| 8,477,290 B2 | 7/2013 | Yamada |
| 8,675,181 B2 | 3/2014 | Hall |
| 8,742,325 B1 | 6/2014 | Droz et al. |
| 8,767,190 B2 | 7/2014 | Hall |
| 8,836,922 B1 | 9/2014 | Pennecot et al. |
| 9,069,060 B1 | 6/2015 | Zbrozek et al. |
| 9,086,273 B1 | 7/2015 | Gruver et al. |
| 9,285,464 B2 | 3/2016 | Pennecot et al. |
| 9,299,731 B1 | 3/2016 | Lenius et al. |
| 9,368,936 B1 | 6/2016 | Lenius et al. |
| 9,529,079 B1 | 12/2016 | Droz et al. |
| RE46,672 E | 1/2018 | Hall |
| 2002/0140924 A1* | 10/2002 | Wangler ............... G01S 7/4802 356/28 |
| 2005/0124310 A1* | 6/2005 | Yamamoto ........... H04B 1/1081 455/296 |
| 2008/0316463 A1 | 12/2008 | Okada et al. |
| 2010/0110006 A1* | 5/2010 | Lee ..................... G06F 3/0308 345/158 |
| 2010/0220141 A1 | 9/2010 | Ozawa |
| 2010/0302528 A1 | 12/2010 | Hall |
| 2011/0216304 A1 | 9/2011 | Hall |
| 2011/0255070 A1 | 10/2011 | Phillips et al. |
| 2012/0188136 A1* | 7/2012 | Brasile .................. H01Q 3/08 343/758 |
| 2012/0194398 A1* | 8/2012 | Brasile .................. H01Q 3/10 343/763 |
| 2012/0274147 A1* | 11/2012 | Stecher ............... H04B 5/0037 307/104 |
| 2014/0274216 A1* | 9/2014 | Olodort ............... H04M 1/006 455/566 |
| 2014/0295755 A1 | 10/2014 | Graf |
| 2015/0055117 A1* | 2/2015 | Pennecot .............. G01S 17/89 356/4.01 |
| 2015/0091374 A1* | 4/2015 | Lenius .................. H02J 17/00 307/9.1 |
| 2015/0193934 A1* | 7/2015 | Fuchikami ........... G06F 3/017 348/142 |
| 2015/0293228 A1 | 10/2015 | Retterath et al. |
| 2016/0047901 A1 | 2/2016 | Pacala et al. |
| 2016/0274221 A1* | 9/2016 | Wu ...................... G01S 7/4817 |
| 2016/0380487 A1* | 12/2016 | Widmer ................ H02J 50/12 324/654 |
| 2017/0176576 A1* | 6/2017 | Kotelnikov ........... G01S 17/89 |
| 2017/0350967 A1* | 12/2017 | Wilton .................. G01S 17/10 |
| 2018/0191222 A1 | 7/2018 | Berger et al. |
| 2018/0191404 A1 | 7/2018 | Berger et al. |

FOREIGN PATENT DOCUMENTS

| | | |
|---|---|---|
| WO | WO03073123 | 9/2003 |
| WO | WO2012172526 A1 | 12/2012 |

OTHER PUBLICATIONS

Efficient Power Conversion, Why GaN circuits make better Lidar, retrieved on Mar. 3, 2017 at <<http://epc-co.com/epc/DesignSupport/TrainingVideos/eGaNDemos/GaN-circuits-make-better-LiDAR.aspx>> 2 pages.
Notice of Allowance from the U.S. Patent and Trademark Office for U.S. Appl. No. 14/462,075, dated Nov. 18, 2015. 8 pages.
Office Action from the U.S. Patent and Trademark Office ofr U.S. Appl. No. 14/462,075, dated Jun. 17, 2015. 14 pages.
The PCT Search Report and Written Opinion dated Nov. 19, 2014 for PCT Application No. PCT/US2014/047864, 12 pages.
Rim et al., "The optical advantages of curved focal plane arrays," Optics Express, vol. 16, No. 7, Mar. 31, 2008, 1 page.
Xu et al., "A calibration method of the multi-channel imaging lidar," Proceedings SPIE 9080, Laser Radar Technology and Applications XIX; and Atmospheric Propagation XI, 90800V, Jun. 9, 2014, 2 pages.
Office Action for U.S. Appl. No. 15/487,044, dated Mar. 14, 2018, Berger, "Interface for Transferring Power and Data Between a Non-Rotating Body and a Rotating Body", 13 pages.
The PCT Invitation to Pay Additional Fees dated Mar. 12, 2018 for PCT application No. PCT/US2017/067553, 16 pages.
The PCT Search Report and Written Opinion dated May 7, 2018, for PCT Application No. PCT/US17/67553, 19 pages.

* cited by examiner

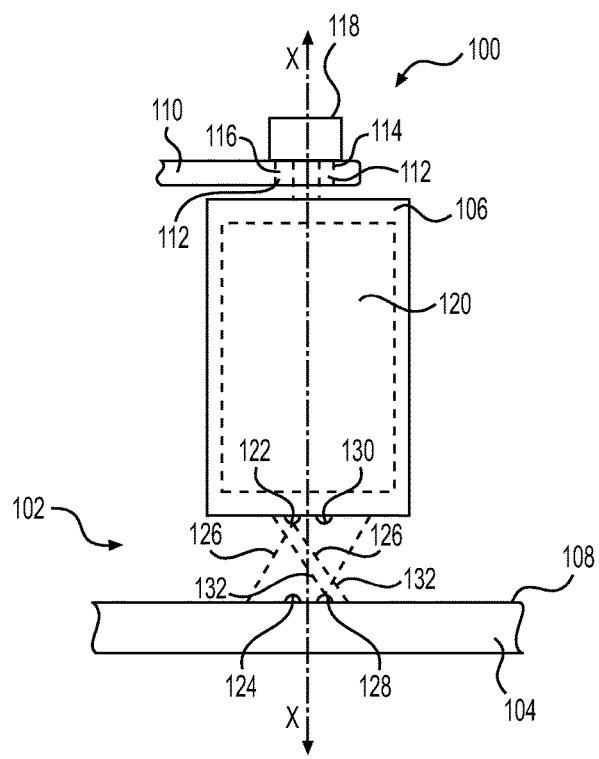
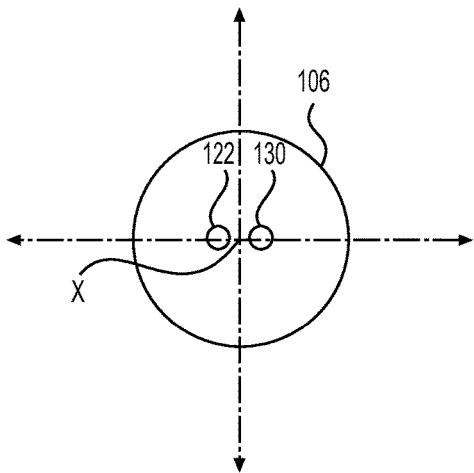 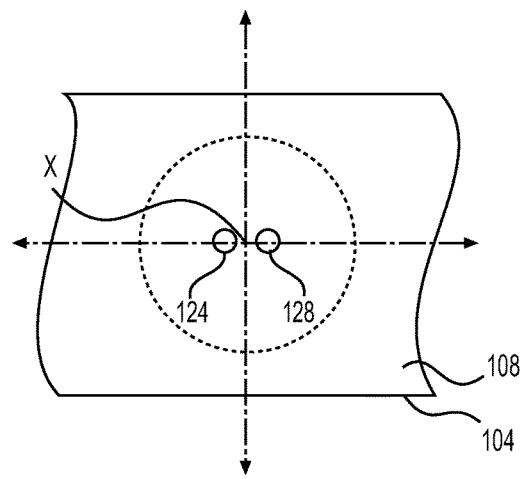
FIG. 1A
FIG. 1B  FIG. 1C

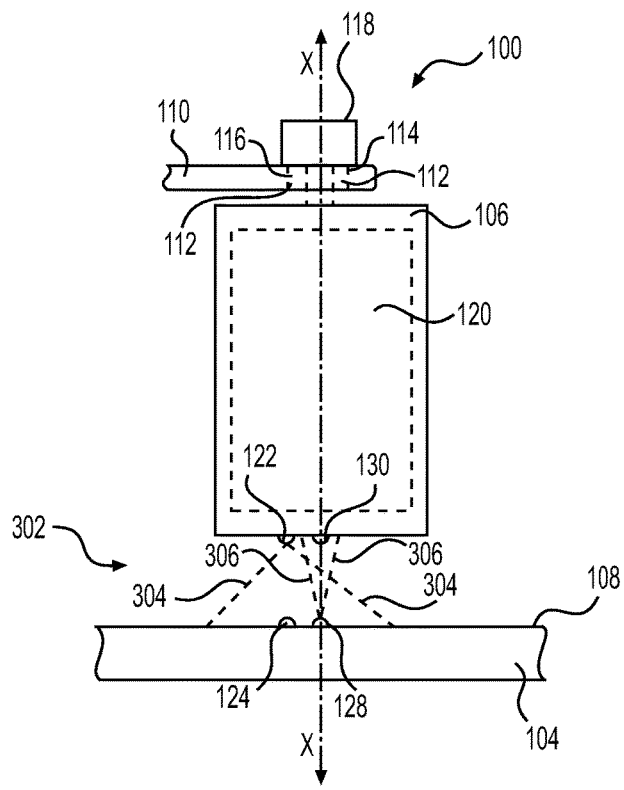
FIG. 3A
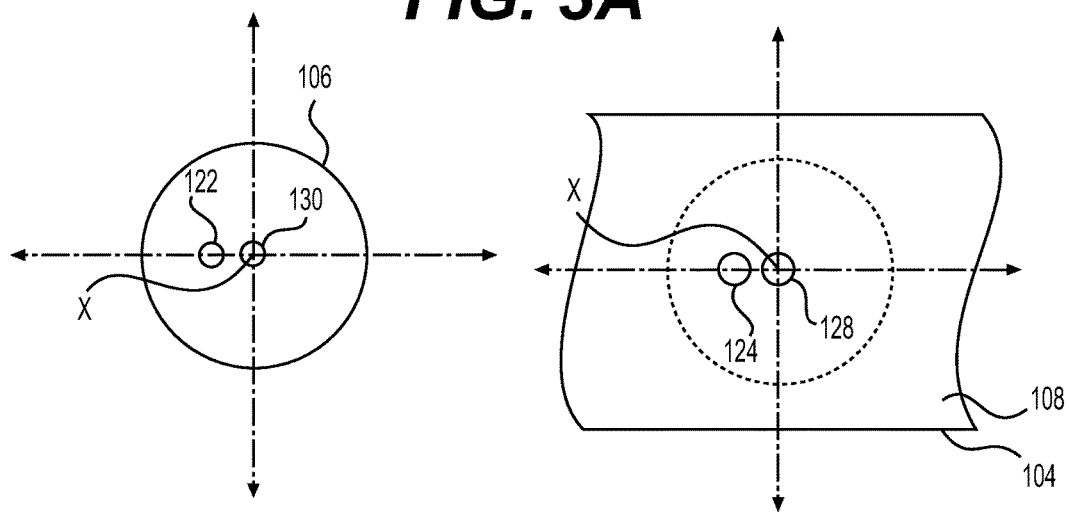
FIG. 3B  FIG. 3C

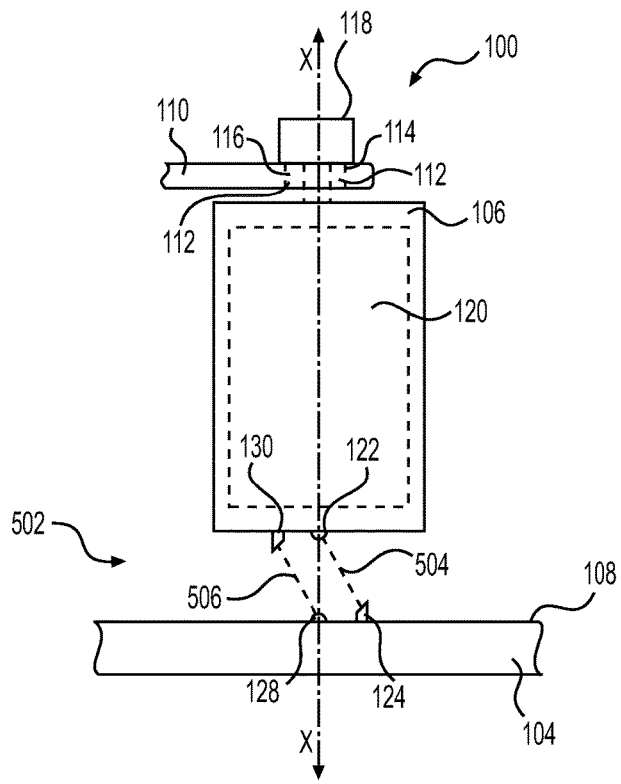
FIG. 5A
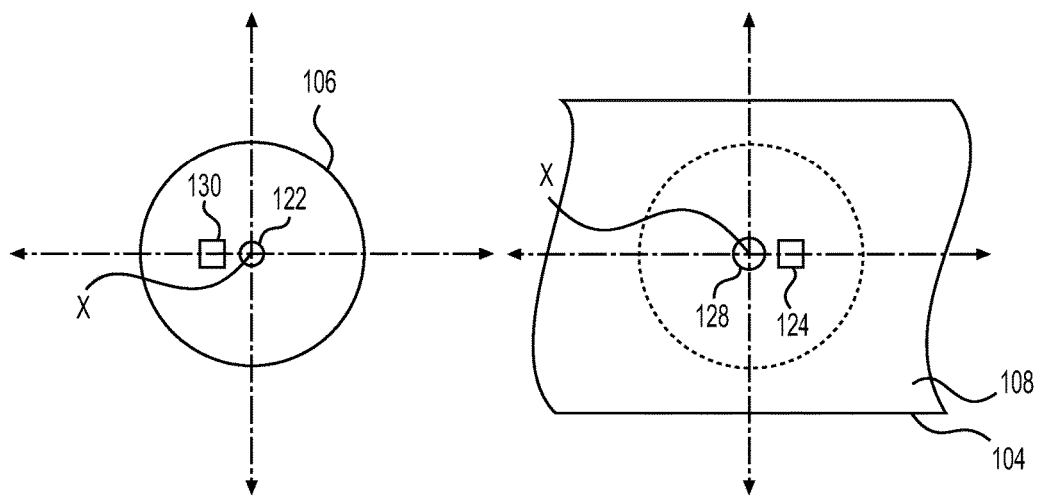
FIG. 5B  FIG. 5C

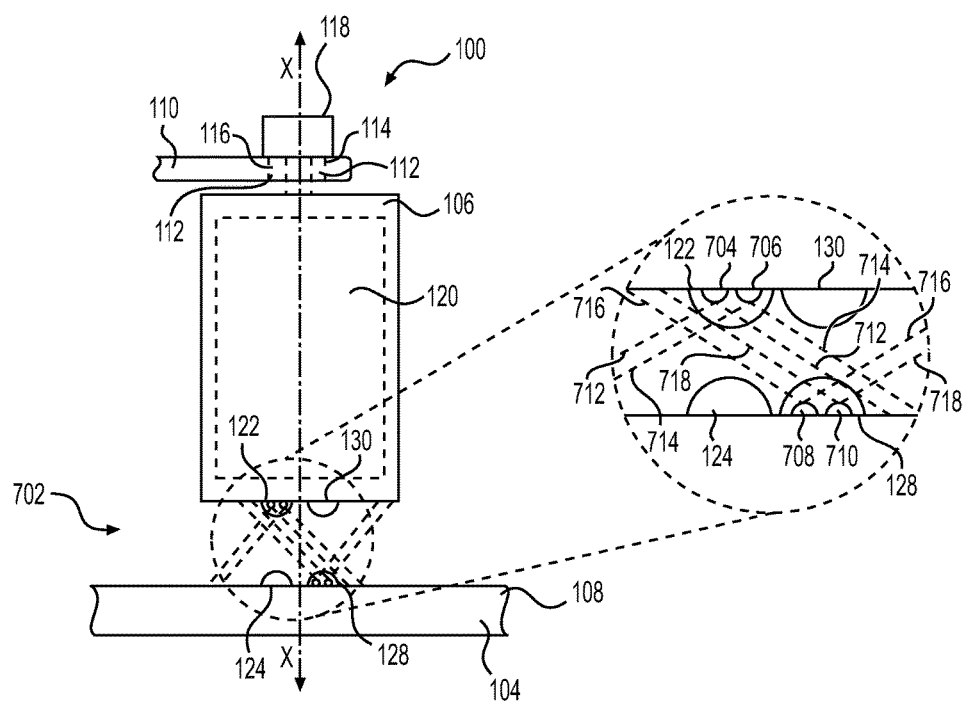
FIG. 7A
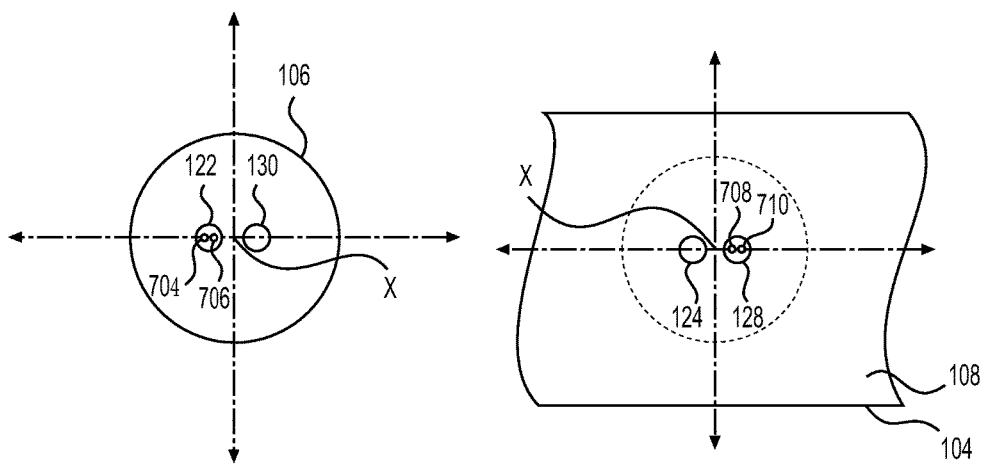
FIG. 7B  FIG. 7C

INTERFACE FOR TRANSFERRING DATA BETWEEN A NON-ROTATING BODY AND A ROTATING BODY

RELATED APPLICATIONS

This application claims priority to and is a continuation-in-part of U.S. patent application Ser. No. 15/487,044, filed Apr. 13, 2017, which claims priority to U.S. Provisional Application No. 62/440,671, filed Dec. 30, 2016, both of which are incorporated herein by reference.

BACKGROUND

There are circumstances under which it would be beneficial to transfer data between a non-rotating body and a rotating body. For example, if an electronic device included in the rotating body generates data signals, it may be beneficial to transfer the data signals from the electronic device associated with the rotating body to the non-rotating body. However, rotation of the rotating body may prevent the use of hard-wired connections between the rotating body and the non-rotating body.

Some techniques have been used to transfer data signals between a rotating body and a non-rotating body, such as slip rings, wireless radios, and rotary transformers. However, such techniques include drawbacks and limitations. For instance, slip rings are susceptible to wear and tear, which can cause problems with the connection. Wireless radios can be jammed by external sources, and can have problems with electromagnetic interference (EMI). Additionally, rotary transformers can include problems with EMI and may have a low bandwidth.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 1A is a partial schematic side view of a first example assembly including an example non-rotating body, an example rotating body, and a first example interface for transferring data between the non-rotating body and the rotating body.

FIG. 1B is a schematic bottom view of the first example assembly shown in FIG. 1A.

FIG. 1C is a partial schematic top view of the first example assembly shown in FIG. 1A.

FIG. 3A is a partial schematic side view of a third example assembly including an example non-rotating body, an example rotating body, and a third example interface for transferring data between the non-rotating body and the rotating body.

FIG. 3B is a schematic bottom view of the third example assembly shown in FIG. 3A.

FIG. 3C is a partial schematic top view of the third example assembly shown in FIG. 3A.

FIG. 5A is a partial schematic side view of a fifth example assembly including an example non-rotating body, an example rotating body, and a fifth example interface for transferring data between the non-rotating body and the rotating body.

FIG. 5B is a schematic bottom view of the fifth example assembly shown in FIG. 5A.

FIG. 5C is a partial schematic top view of the fifth example assembly shown in FIG. 5A.

FIG. 7A is a partial schematic side view of a seventh example assembly including an example non-rotating body, an example rotating body, and a seventh example interface for transferring data between the non-rotating body and the rotating body.

FIG. 7B is a schematic bottom view of the seventh example assembly shown in FIG. 7A.

FIG. 7C is a partial schematic top view of the seventh example assembly shown in FIG. 7A.

DETAILED DESCRIPTION

Figure 2A:
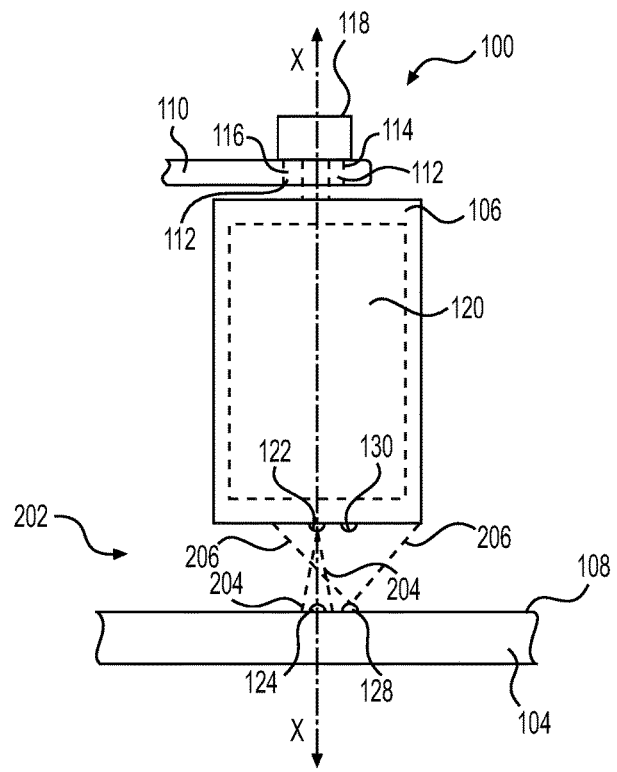
FIG. 2A is a partial schematic side view of a second example assembly including an example non-rotating body, an example rotating body, and a second example interface for transferring data between the non-rotating body and the rotating body.

As discussed above, it may be beneficial to transfer data between a non-rotating body and a rotating body. For example, if electronic devices included in the rotating body generate data signals, it may be beneficial to transfer the data signals from the electronic devices associated with the rotating body to a non-rotating body. However, rotation of the rotating body may prevent the use of hard-wired connections between the rotating body and the non-rotating body.

The disclosure is generally directed to an interface for transferring data between a non-rotating body and a rotating body. For instance, the rotating body may carry one or more sensors configured to generate sensor signals. The interface may transfer the sensor outputs (e.g., in the form of data signals) from the rotating body to the non-rotating body. Additionally, or alternatively, the interface may transfer data signals from the non-rotating body to the rotating body. For instance, the data signals transferred from the non-rotating body to the rotating body may be used for controlling operation of, and/or characteristics of electrical power used by, the one or more sensors and other electrically-powered devices carried by the rotating body. The data signals can further include software and/or firmware updates for the one or more sensors and other electrically-powered devices.

In some instances, the non-rotating body may define a substantially planar surface, and an axis of rotation of the rotating body may be substantially perpendicular to the planar surface. For instance, the axis of rotation of the rotating body may be perpendicular to the planar surface within technical tolerances. Additionally, in some instances, the non-rotating body and the rotating body may be coupled to one another, such as when the non-rotating body and the rotating body are components of a sensor assembly.

In some instances, the interface may be used with a vehicle to provide the transfer of data signals between the vehicle and one or more sensors carried by a rotating body. For instance, the interface may be disposed between a non-rotating body coupled to the vehicle and the rotating body. In some examples, the rotating body may be rotatably coupled to the non-rotating body (e.g., by an axle or spindle). In some examples, the rotating body may be separate and spaced a distance from the non-rotating body (e.g., the rotating body may be coupled to the vehicle or other mounting surface separate and a distance apart from the non-rotating body). The interface may be configured to transfer the data signals from the non-rotating body to the rotating body in order to, for example, control the one or more sensors and other electrically-powered devices carried by the rotating body. The interface may further be configured to transfer sensor signals in the form of data signals from the one or more sensors carried by the rotating body to the non-rotating body, for example, so that a controller of the vehicle may incorporate the sensor signals into a strategy for controlling an aspect of operation of the vehicle.

In some instances, an interface may include a first data transmitter coupled to the rotating body and configured to transmit first data signals, and a first data receiver coupled to the non-rotating body and configured to receive the first data signals from the first data transmitter via a first wireless coupling. The interface may further include a second data transmitter coupled to the non-rotating body and configured to transmit second data signals, and a second data receiver coupled to the rotating body and configured to receive the second data signals from the second data transmitter via a second wireless coupling. In some instances, the first data transmitter and the first data receiver may each include an optical communication device, and the first wireless coupling between the first data transmitter and the first data receiver may include a first optical coupling. Additionally, in some instances, the second data transmitter and the second data receiver may each include an optical communication device, and the second wireless coupling between the first data transmitter and the second data transmitter may include a second optical coupling.

For example, the first data transmitter may include a first optical transmitter, such as a light emitting diode (LED), a laser diode (e.g., vertical-cavity surface-emitting laser), or the like, and the first data receiver may include a first optical receiver, such as a photodetector (e.g., semiconductor-based photodiode, metal-semiconductor-metal photodetector, etc.). Additionally, the second data transmitter may include a second optical transmitter, such as a LED, a laser diode (e.g., vertical-cavity surface-emitting laser), or the like, and the second data receiver may include a second optical receiver, such as a photodetector (e.g., semiconductor-based photodiode, metal-semiconductor-metal photodetector, etc.). In such examples, the first optical coupling and the second optical coupling may each include a free-space optical coupling.

In some instances, interference between the first data transmitter and the second data receiver pair, and the second data transmitter and the second data receiver pair, may be mitigated or eliminated using differences in the communication signals. For instance, the first data transmitter may transmit the first data signals using a first wavelength and/or first frequency, and the second data transmitter may transmit the second data signals using a second wavelength and/or second frequency. The first wavelength may include a different wavelength than the second wavelength and/or the first frequency may include a different frequency than the second frequency. For instance, when the first transmitter includes a first optical transmitter, the first data transmitter may emit first light that represents the first data signal, where the first light includes a first wavelength. Additionally, when the second data transmitter includes a second optical transmitter, the second data transmitter may emit second light that represents a second data signal, where the second light includes a second wavelength.

In some instances, the first data transmitter may transmit the first data signals and/or the second data transmitter may transmit the second data signals using frequency modulation. For instance, the first data transmitter may vary the instantaneous frequency of the first data signals by a first amount and the second data transmitter may vary the instantaneous frequency of the second data signals by a second amount. In some instances, the first amount is different than the second amount.

In some instances, the first data transmitter may transmit the first data signals using a different frequency than the second data transmitter transmits the second data signals. For instance, the first data transmitter may include a first optimal transmitter that pulses first light using a first frequency while the second data transmitter includes a second optical transmitter that pulses second light using a second frequency. In some instances, the first frequency at which the first optical transmitter pulses the first light may be faster than the second frequency at which the second optical transmitter pulses the second light. Additionally, or alternatively, in some instances, the first frequency at which the first optical transmitter pulses the first light may be slower than the second frequency at which the second optical transmitter pulses the second light.

In some instances, the first data transmitter and the first data receiver may be axially aligned along the axis of rotation of the rotating body, while the second data transmitter and the second data receiver are radially offset from the axis of rotation (i.e., offset from the axis of rotation in a direction perpendicular to the axis of rotation) by a given distance. In some instances, the first data transmitter and the first data receiver may be radially offset from the axis of rotation of the rotating body by a first distance, while the second data transmitter and the second data receiver are radially offset from the axis of rotation by a second distance. The first distance may be equal to the second distance, or the first distance may be different than the second distance.

In some instances, the first data receiver and the second data receiver may be axially aligned with the axis of ration of the rotating body. Additionally, the first data transmitter may be radially offset from the axis of rotation by a first distance and the second data transmitter may be radially offset from the axis of rotation by a second distance, where the first distance can be equal to or different than the second distance. In some instances, the first data transmitter and the second data transmitter may be axially aligned with the axis of rotation of the rotating body. Additionally, the first data receiver may be radially offset from the axis of rotation by a first distance and the second data receiver may be radially offset from the axis of rotation by a second distance, where the first distance can be equal to or different than the second distance.

In some instances, when the first data transmitter and the second transmitter are axially aligned with the axis of rotation, the interface may further include a first beam splitter coupled to the rotating body and a second beam splitter coupled to the non-rotating body. For instance, the first data signals transmitted from the first data transmitter may pass through the first beam splitter to the second beam splitter, which reflects at least a portion of the first data signals towards the first data receiver. Additionally, the second data signals transmitted from the second data transmitter may pass through the second beam splitter to the first beam splitter, which reflects at least a portion of the second data signals towards the second data receiver. In some instances, each of the first beam splitter and the second beam splitter may be made of a material, and/or include a coating, that is specific to a wavelength of light. For instance, when the first data transmitter emits first light at a first wavelength and the second data transmitter emits second light at a second wavelength, the first beam splitter may be coated with a first coating that is configured to transmit light at the first wavelength and reflect light at the second wavelength. Additionally, the second beam splitter may include a second coating that is configured to transmit light at the second wavelength and reflect light at the first wavelength.

In some instances, the interface may include one or more amplifiers and/or limiters (e.g., circuits). For example, the interface may include a first amplifier that increases the power of the first data signals transmitted by the first data transmitter and/or the interface may include a second amplifier that increases the power of the second data signals transmitted by the second data transmitter. For a second example, the interface may include a first transimpedance amplifier (TIA) that amplifies the output of the first data receiver and/or the interface can include a second TIA that amplifies the output of the second data receiver. For a third example, the interface may include a first limiter that attenuates the first data signals received by the first data receiver that are above a first threshold frequency and/or below a second threshold frequency, and the interface may include a second limiter that attenuates the second data signals received by the second data receiver that are above a third threshold frequency and/or below a fourth threshold frequency.

In some instances, the first threshold frequency can include substantially the same frequency (e.g., within a threshold deviation, such as 1%, 2%, 5%, or the like) as the third threshold frequency and/or the second threshold frequency can include substantially the same frequency (e.g., within a threshold deviation, such as 1%, 2%, 5%, or the like) as the fourth threshold frequency. Additionally, or alternatively, in some instances, the first threshold frequency can be different than the third threshold frequency and/or the second threshold frequency can be different than the fourth threshold frequency. For instance, the first threshold frequency and the second threshold frequency may be determined based on the wavelength of the first data signals transmitted by the first data transmitter. Additionally, the third threshold frequency and the fourth threshold frequency may be determined based on the wavelength of the second data signals transmitted by the second data transmitter.

In some instances, a tunneling protocol may be used in order to reduce the complexity of hardware and/or software associated with the interface. For instance, both the hardware within the rotating body and the hardware within the non-rotating body may utilize a common protocol. In some instances, the protocol can include Ethernet, Fiber Channel, Fire Wire, or other serial and/or parallel high-definition multimedia interface (HDMI).

The techniques and systems described herein may be implemented in a number of ways. For instance, certain examples described herein are in the context of a light detection and ranging (LIDAR) sensor assembly. In other instances, the techniques may be applied to transfer data and/or power between any stationary component (e.g., non-rotating) and any rotating component, between any first stationary component and any second stationary component, and/or between any first rotating component and any second rotating component.

Additionally, the techniques and systems described herein may be implemented using various hardware devices. In some instances, the hardware devices are selected such that a respective data transmitter and a respective data receiver can be mounted together on a single hardware device. For example, and using surface-mount technology (SMT), the first data transmitter and the second data transmitter may be mounted or placed on a surface of a first printed circuit board (PCB) of a body (e.g., rotating body) and the second data transmitter and the second data transmitter may be mounted or placed on a surface of a second PCB of a second body (e.g., non-rotating body). For a second example, and using optoelectronic mounts (e.g., TO Cans), the first data transmitter and the second data transmitter may be placed in a first package mounted to the first body and the second data transmitter and the second data transmitter may be placed in a second package mounted to the second body. Additionally, in some examples, silicon may be placed in each of the packages and used to wire bond the respective data transmitter and the respective data receiver to pins of the respective package.

In some instances, a spacing between a respective data transmitter and a respective data receiver is relatively small (e.g., at most five millimeters). However, in other examples, the spacing between the respective data transmitter and the respective data receiver may be less than five millimeters. Additionally, in other examples, the spacing between the respective data transmitter and the respective data receiver may be greater than five millimeters. In some instances, the spacing can depend on one or more factors, such as the amount of power the data transmitters are receiving, the divergence of the light emitted by the data transmitters, the responsivity of the data receivers, the view angles of the data receivers, and the physical size of the data receivers FIGS. 1A-1C are schematic views of an example assembly 100 that includes a first example interface 102 for transferring data signals between a non-rotating body 104 and a rotating body 106. In the example shown, the non-rotating body 104 is associated with the rotating body 106, such that the rotating body 106 rotates about an axis of rotation X that passes through the non-rotating body 104. In some instances, the rotating body 106 may be configured to rotate through an angle of 360 degrees or more in either direction about its axis of rotation X Additionally, or alternatively, in some examples, the rotating body 106 may be configured to rotate through an angle of less than 360 degrees and reverse its direction of rotation about its axis of rotation X For example, the rotating body 106 may be configured to oscillate about its axis X without completing a 360-degree rotation.

In some examples, the non-rotating body 104 may define or include a substantially planar surface 108, and the axis of rotation X of the rotating body 106 may be substantially perpendicular to the planar surface 108, for example, such that the axis of rotation X of the rotating body 106 may be substantially perpendicular to the planar surface 108 within technical tolerances. In some instances, the rotating body 106 may be substantially cylindrical, though any other shape is contemplated. In some instances, the axis of rotation X of the rotating body 106 may be orthogonal to the planar surface 108. In some instances, the non-rotating body 104 and the rotating body 106 may be rotatably coupled to one another. In some instances, the non-rotating body 104 may be coupled to the rotating body 106, for example, such that the non-rotating body 104 at least partially supports the rotating body 106. In some instances, a planar surface of the rotating body 106, in which at least one data transmitter and at least one data receiver may be mounted, and the planar surface 108 of the non-rotating body 104 remain substantially parallel to one another during the entire rotation of the rotating body 106.

In the example shown in FIG. 1A, the assembly 100 includes a support 110 configured to at least partially support the rotating body 106, such that the rotating body 106 is able to rotate about its axis of rotation X For example, a bearing 112 may be provided in a bore 114 of the support 110, and a shaft 116 may extend through the bearing 112 and be coupled to the rotating body 106. The example shown includes a motor 118 (e.g., an electric motor) coupled to the shaft 116 and configured to apply torque to the shaft 116 to rotate the rotating body about the axis X Other arrangements are contemplated. For instance, the motor 118 may be located remotely from the shaft 116, and torque from the motor 118 may be provided by a device for transmitting torque from the motor 118 to the shaft 116, such as, for example, one or more gears, one or more shafts, one or more belts, and/or one or more chain drives. In some instances, the motor 118 may be located between the support 110 and the rotating body 106. In some instances, the motor 118 may be located at the other end of the rotating body 106, for example, between the non-rotating body 104 and the rotating body 106, or on the opposite side of the non-rotating body 104 from the rotating body 106. In some examples, the motor 118 may be located on the rotating body 106. In some examples, the motor 118 may be comprised of the rotating body 106 and the non-rotating body 104 (e.g., the rotating body may comprise a rotor and the non-rotating body may comprise a stator of the motor). In some instances, the non-rotating body 104 may include a bore and/or a bearing therein (not shown in FIG. 1A) (e.g., similar to the bearing 112 associated with the support 110), and may at least partially support the rotating body 106, such that it may rotate about the axis X of the rotating body 106.

In some instances, the rotating body 106 may be associated with one or more electronic devices 120. For instance, the electronic devices 120 may be carried by or within the rotating body 106. The electronic devices 120 may include any devices that use electrical power to perform functions, such as, for example, sensors configured to generate sensor signals in the form of data signals, processors configured to manipulate the data signals (e.g., processors that filter, compress, and/or transform the data signals), motors or actuators to move components, and/or controllers to control operation of the sensors, motors, actuators, and/or the rotating body 106. Other types and functions of electronic devices 120 are contemplated.

The example assembly 100 shown in FIG. 1A also includes the interface 102 for transferring at least data between the non-rotating body 104 and the rotating body 106. The example interface 102 shown in FIGS. 1A-1C includes a first data transmitter 122 associated with (e.g., coupled to) the rotating body 106 and configured to transmit first data signals, and a first data receiver 124 associated with (e.g., coupled to) the non-rotating body 104 and configured to receive the first data signals from the first data transmitter 122 via a first wireless coupling. In the example shown, the first data transmitter 122 is associated with the end (e.g., the planar surface) of the rotating body 106 facing the planar surface 108, and the first data receiver 124 is coupled to the planar surface 108. The first data transmitter 122 may be configured to send the first data signals (e.g., sensor data, first optical signals, and/or other data signals) from the rotating body 106 to the first data receiver 124.

In some instances, the first data transmitter 122 and the first data receiver 124 may be configured to provide unidirectional data transfer from the rotating body 106 to the non-rotating body 104. In some instances, the first data transmitter 122 and the first data receiver 124 may be configured to wirelessly transfer data signals via a high-speed wireless link (e.g., a wireless link having a data transfer rate of greater than or equal to 50 kilobits per second (kbps)). For instance, the first data transmitter 122 and the first data receiver 124 may each include an optical communication device and the first wireless coupling between the first data transmitter 122 and the first data receiver 124 provides a first optical coupling.

For example, the first optical coupling may be a free-space optical coupling. In some instances, the first data transmitter 122 may include a first optical transmitter, such as, for example, an LED, a laser diode (e.g., vertical-cavity surface-emitting laser), or the like. Additionally, the first data receiver 124 may include a first optical receiver, such as, for example, a photodetector (e.g., semiconductor-based photodiode, metal-semiconductor-metal photodetector, etc.). In some instances, and as shown in the example of FIGS. 1A-1C, the first data transmitter 122 and the first data receiver 124 are radially offset from the axis of rotation X of the rotating body 106 by a first distance. In some instances, since the first data transmitter 122 rotates around the axis of rotation X, and the first data receiver 124 is stationary on the non-rotating body 104, the first data transmitter 122 may emit light having a beam angle or "spread" that diverges sufficiently to cover the first data receiver 124 during the entire rotation of the rotating body 106. The light emitted by the first data transmitter is represented by lines 126. For instance, the first data transmitter 122 may emit first light that represents the first data signals, where the first light includes a first wavelength and diverges from the first data transmitter 122.

The interface 102 shown in FIGS. 1A-1C also includes a second data transmitter 128 associated with (e.g., coupled to) the non-rotating body 104 and configured to transmit second data signals, and a second data receiver 130 associated with (e.g., coupled to) the rotating body 106 and configured to receive the second data signals from the second data transmitter 128 via a second wireless coupling. In the example shown, the second data receiver 130 is associated with the end of the rotating body 106 facing the planar surface 108, and the second data transmitter 128 is coupled to the planar surface 108. The second data transmitter 128 may be configured to send the second data signals (e.g., data signals, second optical signals, and/or other data signals) from the non-rotating body 104 to the second data receiver 130, which is associated with the rotating body 106.

In some instances, the second data transmitter 128 and the second data receiver 130 may be configured to provide uni-directional data transfer from the non-rotating body 104 to the rotating body 106. In some instances, the second data transmitter 128 and the second data receiver 130 may be configured to wirelessly transfer data signals via a high-speed wireless link (e.g., a wireless link having a data transfer rate of greater than or equal to 50 kilobits per second (kbps)). For instance, the second data transmitter 128 and the second data receiver 130 may each include an optical communication device and the second wireless coupling between the second data transmitter 128 and the second data receiver 130 provides a second optical coupling.

For example, the second optical coupling may be a free-space optical coupling. In some instances, the second data transmitter 128 may include a second optical transmitter, such as, for example, an LED, a laser diode (e.g., vertical-cavity surface-emitting laser), or the like. Additionally, the second data receiver 130 may include a second optical receiver, such as, for example, a photodetector (e.g., semiconductor-based photodiode, metal-semiconductor-metal photodetector, etc.). In some instances, and as shown in the example of FIGS. 1A-1C, the second data transmitter 128 and the second data receiver 130 are radially offset from the axis of rotation X of the rotating body 106 by a second distance, which may be equal to or different than the first distance. In some instances, since the second data receiver 130 rotates around the axis of rotation X, and the second data transmitter 128 is stationary on the non-rotating body 104, the second data transmitter 128 may emit light having a beam angle or "spread" that diverges sufficiently to cover the second data receiver 130 during the entire rotation of the second data receiver 130. The light emitted by the second data transmitter 128 is which is represented by lines 132. For instance, the second data transmitter 128 may emit second light that represents the second data signals, where the second light includes a second wavelength and diverges from the second data transmitter 128.

In some instances, one or more of the first data transmitter 122, the first data receiver 124, the second data transmitter 128, and the second data receiver 130 may be supplemented with reflectors and/or lenses to assist with maintaining the communication link between the first data transmitter 122 and the first data receiver 124, and/or the communication link the between the second data transmitter 128 and the second data receiver 130. In some instances, cross-talk or interference between the pair of the first data transmitter 122 and the first data receiver 124, and the pair of the second data transmitter 128 and the second data receiver 130, may be mitigated or eliminated via, for example, time sharing techniques and/or by use of bandpass filtering and differences in the communication signals of the pairs (e.g., different frequencies and/or wavelengths of the signals between the pairs).

For instance, the pair of the first data transmitter 122 and the first data receiver 124, and the pair of the second data transmitter 128 and the second data receiver 130, may together provide a bidirectional communication link between the rotating body 106 and the non-rotating body 104. In some instances, to mitigate or eliminate cross-talk or interference, the first data transmitter 122 may transmit the first data signals using a first wavelength and/or first frequency, and the second data transmitter 128 may transmit the second data signals using a second wavelength and/or second frequency. The first wavelength may include a different wavelength than the second wavelength and/or the first frequency may include a different frequency than the second frequency. For instance, the first data transmitter 122 may emit first light that represents the first data signal, where the first light includes a first wavelength, and the second data transmitter 128 may emit second light that represents a second data signal, where the second light includes a second, different wavelength. For example, the first light may include a first color of light and the second light may include a second color of light.

In some instances, when the rotating body 106 includes LIDAR sensors, the first data transmitter 122 may transmit the first data signals using a first frequency and the second data transmitter 128 may transmit the second data signals using a second frequency, where the first frequency and the second frequency do not interfere with the transmission/detections of the LIDAR sensors. For instance, the first frequency and the second frequency may be selected such that each of the first frequency and the second frequency differ from a frequency used by the LIDAR sensors.

Additionally, in some instances, the interface 102 may include a first limiter that attenuates the first data signals received by the first data receiver 124 that are above a first threshold frequency and/or below a second threshold frequency, and the interface 102 may include a second limiter that attenuates the second data signals received by the second data receiver 130 that are above a third threshold frequency and/or below a fourth threshold frequency. In some instances, the first threshold frequency can include substantially the same frequency (e.g., within a threshold deviation, such as 1%, 2%, 5%, or the like) as the third threshold frequency and/or the second threshold frequency can include substantially the same frequency (e.g., within a threshold deviation, such as 1%, 2%, 5%, or the like) as the fourth threshold frequency. Additionally, or alternatively, in some instances, the first threshold frequency can be different than the third threshold frequency and/or the second threshold frequency can be different than the fourth threshold frequency.

For instance, the first threshold frequency and the second threshold frequency may be determined based on the wavelength and/or the frequency of the first data signals transmitted by the first data transmitter 122. For example, the first threshold frequency may be greater that the frequency of the first data signals and the second threshold frequency less than the frequency of the first data signals. Additionally, the third threshold frequency and the fourth threshold frequency may be determined based on the wavelength and/or the frequency of the second data signals transmitted by the second data transmitter 128. For instance, the third threshold frequency may be greater than the frequency of the second data signals and the fourth threshold frequency less than the frequency of the second data signals.

Additionally, in some instances, the threshold frequencies may be determined based on whether the rotating body 106 includes one or more sensors that emit light. For instance, if the rotating body 106 includes light detecting and LIDAR sensors configured to sense objects within an environment by emitting pulses of laser light within the environment, then at least one of the first threshold frequency, the second threshold frequency, the third threshold frequency, or the fourth threshold frequency may be set such that the frequency of the laser light emitter by the LIDAR sensors is attenuated.

Figure 2B:
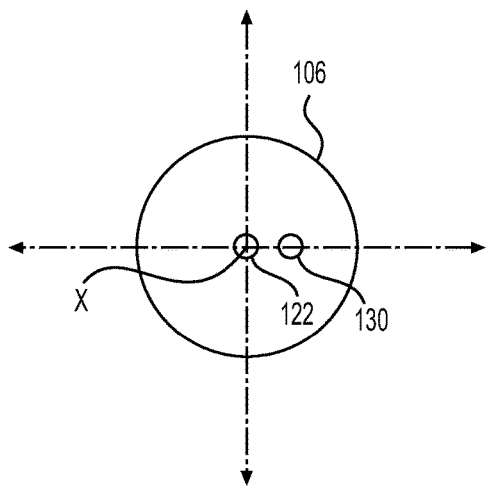
FIG. 2B is a schematic bottom view of the second example assembly shown in FIG. 2A.
Figure 2C:
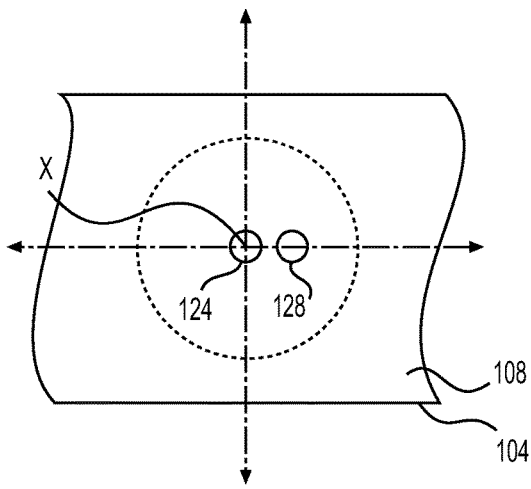
FIG. 2C is a partial schematic top view of the second example assembly shown in FIG. 2A.

FIGS. 2A-2C are schematic views of the example assembly 100 that includes a second example interface 202 for transferring data signals between the non-rotating body 104 and the rotating body 106. As shown, the interface 202 includes the first data transmitter 122 associated with (e.g., coupled to) the rotating body 106 and the first data receiver 124 associated with (e.g., coupled to) the non-rotating body 104. Additionally, the interface 202 includes the second data transmitter 128 is associated with (e.g., coupled to) the non-rotating body 104 and the second data receiver 130 is associated with (e.g., coupled to) the rotating body 106.

In the example of FIGS. 2A-2C, the first data transmitter 122 and the first data receiver 124 are axially aligned with the axis of rotation X of the rotating body 106. In some instances, since the first data transmitter 122 and the first data receiver 124 are axially aligned with the axis of rotation X, the first data transmitter 122 can emit light having a beam angle or "spread" that diverges less than the light emitted by the first data transmitter 122 as shown in FIGS. 1A-1C. In such an example, the smaller "spread" may result in lower power requirements for data transmitter 122. The light emitted by the first data transmitter 122 is represented by lines 204. Additionally, the second data transmitter 128 and the second data receiver 130 are radially offset from the axis of rotation X of the rotating body 106 by a given distance. In some instances, the given distance is greater than the second distance discussed above with regard to the example of FIGS. 1A-1C. In such instances, the second data transmitter 128 can emit light having a beam angle or "spread" that diverges more than the light emitter by the second data transmitter 128 as shown in FIGS. 1A-1C. The light emitted by the second data transmitter is represented by lines 206.

FIGS. 3A-3C are schematic views of the example assembly 100 that includes a third example interface 302 for transferring data signals between the non-rotating body 104 and the rotating body 106. As shown, the interface 302 includes the first data transmitter 122 associated with (e.g., coupled to) the rotating body 106 and the first data receiver 124 associated with (e.g., coupled to) the non-rotating body 104. Additionally, the interface 302 includes the second data transmitter 128 is associated with (e.g., coupled to) the non-rotating body 104 and the second data receiver 130 is associated with (e.g., coupled to) the rotating body 106.

In the example of FIGS. 3A-3C, the first data transmitter 122 and the first data receiver 124 are radially offset from the axis of rotation X of the rotating body 106 by a given distance. In some instances, the given distance can be greater than the first distance discussed above with regard to the example of FIGS. 1A-1C. In such instances, the first data transmitter 122 can emit light having a beam angle or "spread" that diverges greater than the light emitted by first data transmitter 122 as shown in FIGS. 1A-1C. The light emitted by the first data transmitter 122 is represented by lines 304. Additionally, the second data transmitter 128 and the second data receiver 130 are axially aligned with the axis of rotation X of the rotating body 106. In some instances, since the second data transmitter 128 and the second data receiver 130 are axially aligned with the axis of rotation X, the second data transmitter 128 can emit light having a beam angle or "spread" that diverges less than the light emitted by the second data transmitter 128 as in FIGS. 1A-1C. The light emitted by the second data transmitter 128 is represented by lines 306. As above, in such an example, the power requirements for the second data transmitter 128 may be less due than in other examples where the "spread" is larger.

Figure 4A:
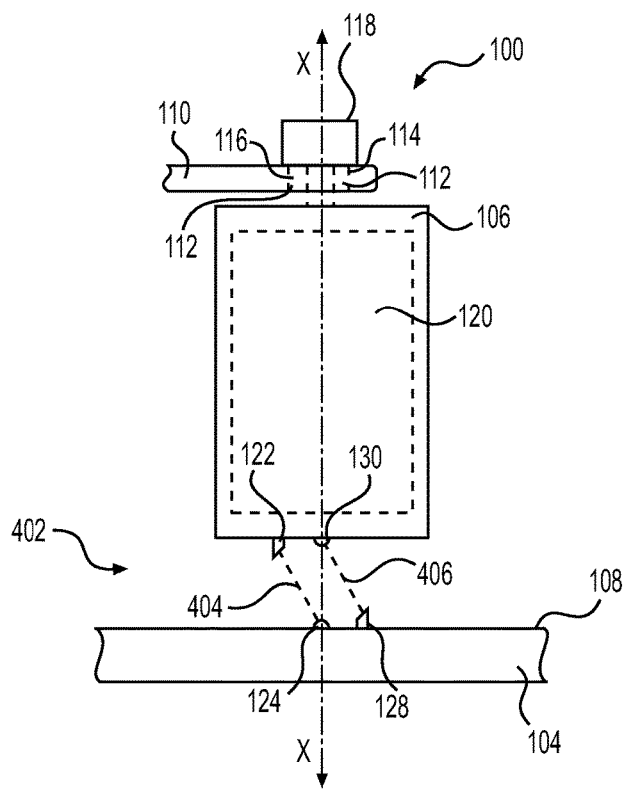
FIG. 4A is a partial schematic side view of a fourth example assembly including an example non-rotating body, an example rotating body, and a fourth example interface for transferring data between the non-rotating body and the rotating body.
Figure 4B:
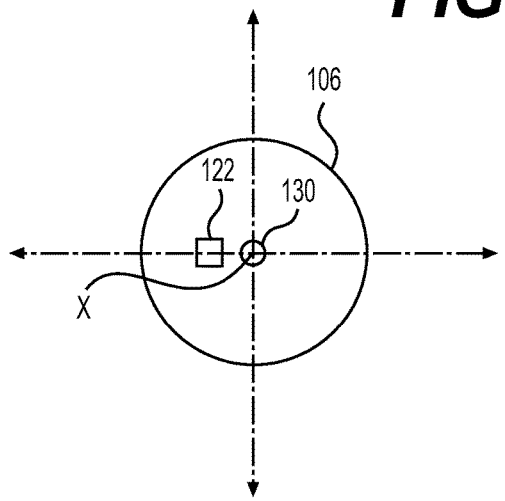
FIG. 4B is a schematic bottom view of the fourth example assembly shown in FIG. 4A.
Figure 4C:
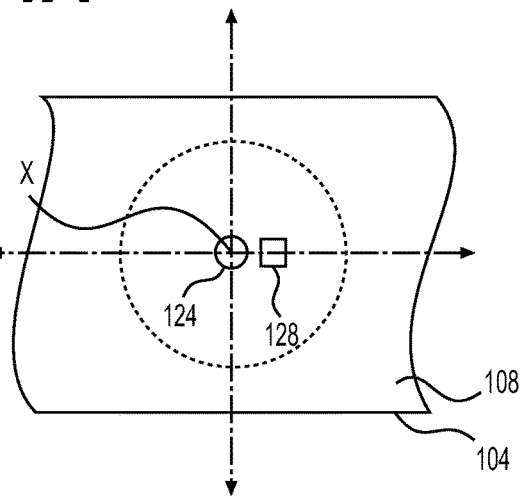
FIG. 4C is a partial schematic top view of the fourth example assembly shown in FIG. 4A.

FIGS. 4A-4C are schematic views of the example assembly 100 that includes a fourth example interface 402 for transferring data signals between the non-rotating body 104 and the rotating body 106. As shown, the interface 402 includes the first data transmitter 122 associated with (e.g., coupled to) the rotating body 106 and the first data receiver 124 associated with (e.g., coupled to) the non-rotating body 104. Additionally, the interface 402 includes the second data transmitter 128 is associated with (e.g., coupled to) the non-rotating body 104 and the second data receiver 130 is associated with (e.g., coupled to) the rotating body 106.

In the example of FIGS. 4A-4C, the first data receiver 124 and the second data receiver 130 are axially aligned with the axis of rotation X of the rotating body 106, and the first data transmitter 122 and the second data transmitter 128 are radially offset from the axis of rotation X of the rotating body 106. The first data transmitter 122, which revolves about and is spaced from the axis X of the rotating body 106 as the rotating body 106 rotates, is aligned with the first data receiver 124 such that as the first data transmitter 122 rotates the emitted light is still incident to the first data receiver 124. The light emitted by the first data transmitter is represented by line 404. Additionally, the second data transmitter 128, which is stationary, is oriented such that it transmits the second data signals to the second data receiver 130 as the second data receiver 130 rotates with the rotating body 106, which is illustrated by line 406.

FIGS. 5A-5C are schematic views of the example assembly 100 that includes a fifth example interface 502 for transferring data signals between the non-rotating body 104 and the rotating body 106. As shown, the interface 502 includes the first data transmitter 122 associated with (e.g., coupled to) the rotating body 106 and the first data receiver 124 associated with (e.g., coupled to) the non-rotating body 104. Additionally, the interface 502 includes the second data transmitter 128 is associated with (e.g., coupled to) to the non-rotating body 104 and the second data receiver 130 is associated with (e.g., coupled to) to the rotating body 106.

In the example of FIGS. 5A-5C, the first data transmitter 122 and the second data transmitter 128 are axially aligned with the axis of rotation X of the rotating body 106, and the first data receiver 124 and the second data receiver 130 are radially offset from the axis of rotation X of the rotating body 106. The first data receiver 124, which is stationary, is oriented such that it receives the first data signals from the first data transmitter 122 as the first data transmitter 122 rotates with the rotating body 106, which is represented by line 504. The second data receiver 130, which revolves about and is spaced from the axis X of the rotating body 106 as the rotating body 106 rotates, is oriented such that it receives the second data signals (e.g., optical data signals)

from the second data transmitter 128, which is stationary, which is represented by line 506.

Figure 6A:
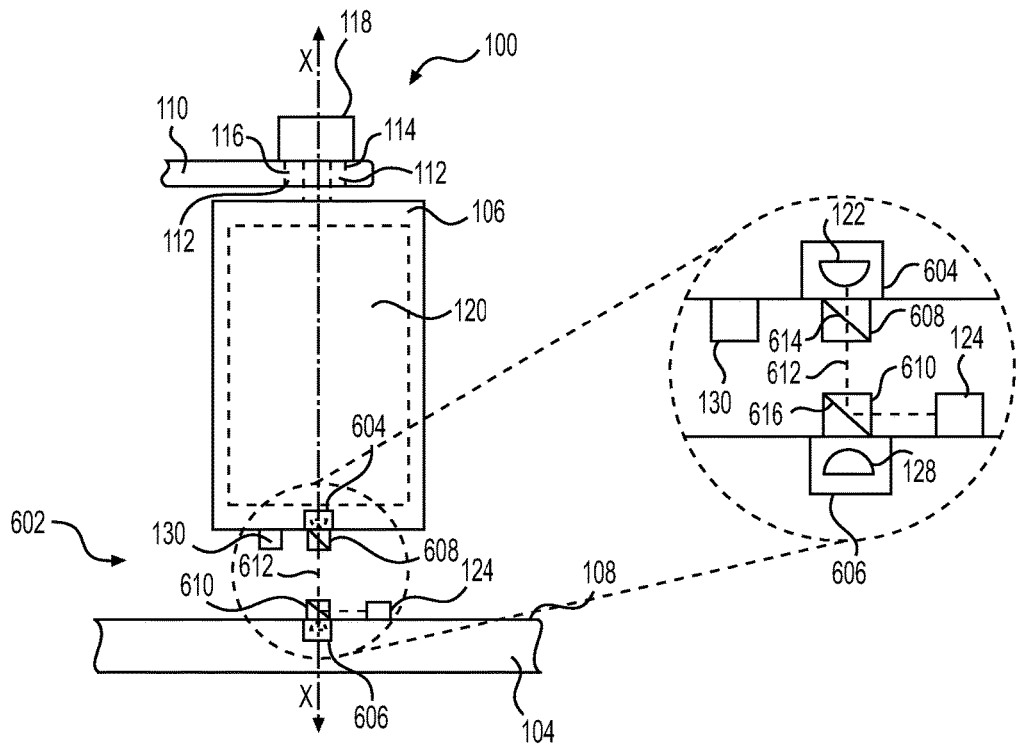
FIG. 6A is a partial schematic side view of a sixth example assembly including an example non-rotating body, an example rotating body, and a sixth example interface for transferring data between the non-rotating body and the rotating body.
Figure 6B:
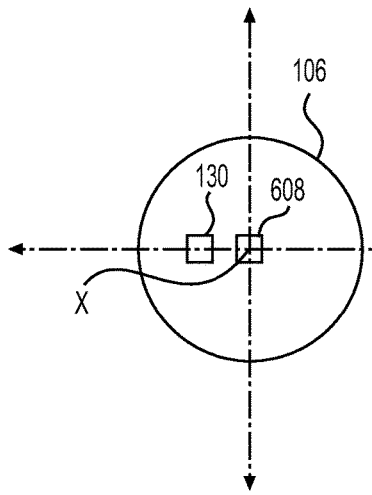
FIG. 6B is a schematic bottom view of the sixth example assembly shown in FIG. 6A.
Figure 6C:
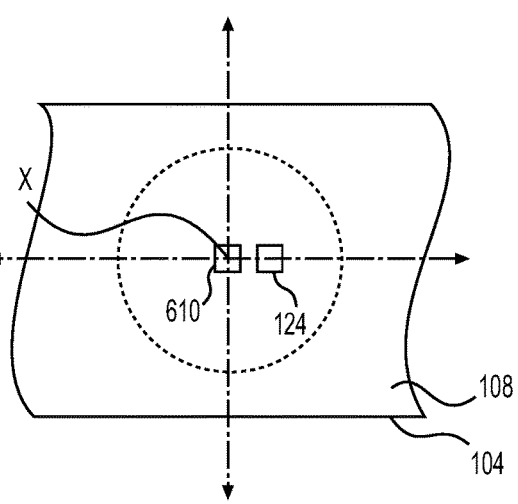
FIG. 6C is a partial schematic top view of the sixth example assembly shown in FIG. 6A.

FIGS. 6A-6C are schematic views of the example assembly 100 that includes a sixth example interface 602 for transferring data signals between the non-rotating body 104 and the rotating body 106. As shown, the interface 602 includes the first data transmitter 122 associated with (e.g., coupled to) the rotating body 106 and the first data receiver 124 associated with (e.g., coupled to) the non-rotating body 104. Additionally, the interface 602 includes the second data transmitter 128 is associated with (e.g., coupled to) the non-rotating body 104 and the second data receiver 130 is associated with (e.g., coupled to) the rotating body 106.

In the example of FIGS. 6A-6C, the first data transmitter 122 is placed within a groove 604 of the rotating body 106 and the second data transmitter 128 is placed within a groove 606 of the non-rotating body 104. Additionally, the first data transmitter 122 and the second data transmitter 128 are axially aligned with the axis of rotation X of the rotating body 106, while the first data receiver 124 and the second data receiver 130 are radially offset from the axis of rotation X of the rotating body 106. The interface 602 further includes a first beam splitter 608 associated with (e.g., coupled to) the rotating body 106 and a second beam splitter 610 associated with (e.g., coupled to) the non-rotating body 104.

The first data signals (and/or at least a portion of the first data signals) transmitted from the first data transmitter 122 may pass through the first beam splitter 608 to the second beam splitter 610, which reflects at least a portion of the first data signals towards the first data receiver 124, which is represented by line 612. In some instances, at least a portion of the first data signals may still transmit through the second beam splitter 610. Additionally, the second data signals (and/or at least a portion of the second data signals) transmitted from the second data transmitter 128 may pass through the second beam splitter 610 to the first beam splitter 608, which reflects at least a portion of the second data signals towards the second data receiver 130 (which is not illustrated in the example of FIGS. 6A-6C for clarity reasons). In some instances, at least a portion of the second data signals may still transmit through the first beam splitter 608. In some instances, each of the first beam splitter 608 and the second beam splitter 610 may include a coating that is specific to a wavelength of light.

For instance, when the first data transmitter 122 emits first light that represents the first data signals, where the first light includes a first wavelength, the first beam splitter 608 may be coated with a first coating 614 that is configured to transmit light at the first wavelength and the second beam splitter 610 may be coated with a second coating 616 that is configured to reflect light at the first wavelength. Additionally, the second data transmitter 128 may emit second light that represents the second data signals, where the second light includes a second wavelength, and the second coating 616 may be configured to transmit light at the second wavelength and the first coating 614 may be configured to reflect light at the second wavelength. As such, the first beam splitter 608 may be configured to reflect a greater amount of light at the second wavelength than light at the first wavelength. Additionally, the second beam splitter 610 may be configured to reflect a greater amount of light at the first wavelength than light at the second wavelength.

It should be noted that, in some instances, the material of the first beam splitter 608 may transmit light at the first wavelength and reflect light at the second wavelength, and the material of the second beam splitter 610 may transmit light at the second wavelength and reflect light at the first wavelength. In such instances, the first beam splitter 608 and/or the second beam splitter 610 may not respectively include the first coating 614 and the second coating 616.

It should further be noted that, in some instances, the first data transmitter 122 may be located at the location of the second data receiver 130, the second data receiver 130 may be located at the location of the first data transmitter 122, the second data transmitter 128 may be located at the location of the first data receiver 124, and/or the first data receiver 124 may be located at the location of the second data transmitter 128. In such instances, the first beam splitter 608 and the second beam splitter 610 may further switch positions. For instance, the first data transmitter 122 may transmit the first data signals such that the second beam filter 610 now located on the rotating body 106 reflects at least a portion of the first data signals towards the first data receiver 124. Additionally, the second data transmitter 128 may transmit the second data signals such that the first beam filter 608 now located on the non-rotating body 104 reflects at least a portion of the second data signals towards the second data receiver 130.

FIGS. 7A-7C are schematic views of the example assembly 100 that includes a seventh example interface 702 for transferring data signals between the non-rotating body 104 and the rotating body 106. As shown, the interface 702 includes the first data transmitter 122 associated with (e.g., coupled to) the rotating body 106 and the first data receiver 124 associated with (e.g., coupled to) the non-rotating body 104. Additionally, the interface 702 includes the second data transmitter 128 is associated with (e.g., coupled to) the non-rotating body 104 and the second data receiver 130 is associated with (e.g., coupled to) to the rotating body 106.

In the example of FIGS. 7A-7C, the interface 702 may use MLT-3 encoding (multi-level transmission) to transmit the data signals between the rotating body 106 and the non-rotating body 104. For instance, the interface 702 may use three or more voltage levels (e.g., −1, 0, +1) to transmit the data signals between the rotating body 106 and the non-rotating body 104. For example, the first data transmitter 122 includes at least a first light source 704 (e.g., a first LED) and a second light source 706 (e.g., second LED). The first light source 704 may emit a first light (e.g., a first light color) at a first wavelength and the second light source 706 may emit second light (e.g., a second light color) at a second wavelength. Additionally, the second data transmitter 128 includes a third light source 708 (e.g., third LED) and a fourth light source 710 (e.g., fourth LED). The third light source 708 may emit third light (e.g., a third light color) at a third wavelength and the fourth light source 710 may emit fourth light (e.g., a fourth light color) at a fourth wavelength.

For example, with regard to the first data transmitter 122, the first light emitted by the first light source 704 may be associated with the voltage level −1, the second light emitted by the second light source 706 may be associated with the voltage level +1, and an "off" state (e.g., the first data transmitter 122 does not emit light) may be associated with the voltage level 0. Additionally, with regard to the second data transmitter 128, the third light emitted by the third light source 708 may be associated with the voltage level −1, the fourth light emitted by the fourth light source 710 may be associated with the voltage level +1, and an "off" state (e.g., the second data transmitter 128 does not emit light) may be associated with the voltage level 0.

Additionally, in the example of FIGS. 7A-7C, the first light source 704 can emit first light having a beam angle or "spread" that diverges sufficiently to cover the first data receiver 124 during an entire rotation of the rotating body 106, and the second light source 706 can emit second light having a beam angle or "spread" that diverges sufficiently to cover the first data receiver 124 during an entire rotation of the rotating body 106. The first light is represented by lines 712 and the second light is represented by lines 714. Moreover, the third light source 708 can emit third light having a beam angle or "spread" that diverges sufficiently to cover the second data receiver 130 during an entire rotation of the rotating body 106, and the fourth light source 710 can emit fourth light having a beam angle or "spread" that diverges sufficiently to cover the second data receiver 130 during an entire rotation of the rotating body 106. The third light is represented by lines 716 and the fourth light is represented by lines 718.

It should be noted that, although the example of FIGS. 7A-7C illustrates each of the first data transmitter 122, the first data receiver 124, the second data transmitter 128, and the second data receiver 130 being radially offset from the axis of rotation X of the rotating body 106 (similar to the interface 102), in other instances, one or more of the first data transmitter 122, the first data receiver 124, the second data transmitter 128, and the second data receiver 130 may be placed at other locations on the rotating body 106 and the non-rotating body 104. For instance, each of the first data transmitter 122, the first data receiver 124, the second data transmitter 128, and the second data receiver 130 may be placed as shown in the example interface 202, the example interface 302, the example interface 402, the example interface 502, the example interface 602, and/or the example interface 702.

It should further be noted that, in some instances, by using the MLT-3 encoding as shown in the example of FIGS. 7A-7C, the interface 702 can emit less electromagnetic interference and/or require less bandwidth than binary or ternary interfaces that operate at a similar bit rate as the interface 702. Furthermore, in some instances, the first data transmitter 122 and/or the second data transmitter 128 may include more than two light sources, where each light source emits light at a given wavelength and/or frequency.

Figure 8A:
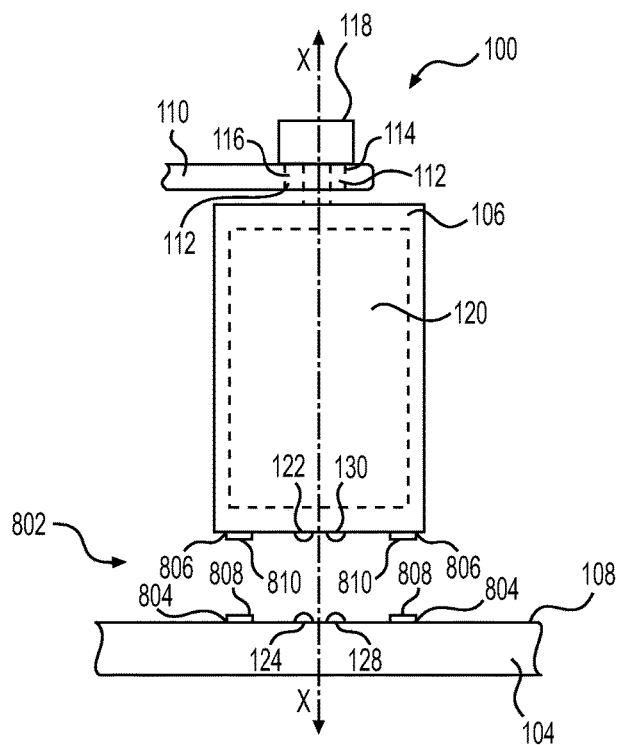
FIG. 8A is a partial schematic side view of an eighth example assembly including an example non-rotating body, an example rotating body, and an eighth example interface for transferring both power and data between the non-rotating body and the rotating body.
Figure 8B:
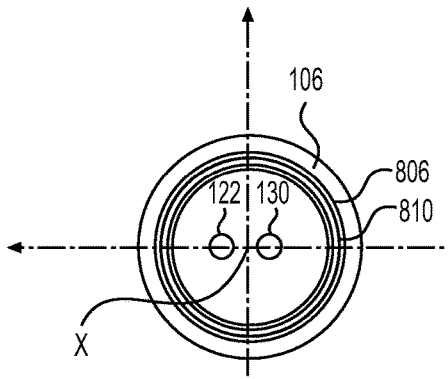
FIG. 8B is a schematic bottom view of the eighth example assembly shown in FIG. 8A.
Figure 8C:
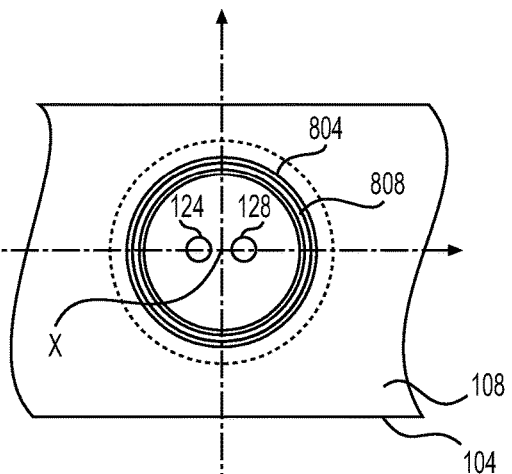
FIG. 8C is a partial schematic top view of the eighth example assembly shown in FIG. 8A.

FIGS. 8A-8C are schematic views of the example assembly 100 that includes an eighth example interface 802 for transferring data signals between the non-rotating body 104 and the rotating body 106. As shown, the interface 802 includes the first data transmitter 122 associated with (e.g., coupled to) the rotating body 106 and the first data receiver 124 associated with (e.g., coupled to) the non-rotating body 104. Additionally, the interface 802 includes the second data transmitter 128 is associated with (e.g., coupled to) the non-rotating body 104 and the second data receiver 130 is associated with (e.g., coupled to) the rotating body 106.

In the example of FIGS. 8A-8C, the interface 802 further includes a power transfer device 804 associated with (e.g., coupled to) the non-rotating body 104 and configured to transfer electrical power. In the example shown, the power transfer device 804 is coupled to the planar surface 108 of the non-rotating body 104. The interface 802 also includes a power receiver 806 associated with (e.g., coupled to) the rotating body 106 and configured to receive the electrical power from the power transfer device 804 via a wireless coupling. In some instances, the wireless coupling between the power transfer device 804 and the power receiver 806 may include an inductive coupling.

In some instances, and as illustrated in the example of FIGS. 8A-8C, the power receiver 806 is associated with the end of the rotating body 106 facing the planar surface 108 of the non-rotating body 104. In some instances, the power transfer device 804 may include a first inductive coil 808 and the power receiver 806 may include a second inductive coil 810. In such instances the power is transferred from the first inductive coil 808 to the second inductive coil 810 by electrical induction. In some instances, the power transfer device 804 and the power receiver 806 are axially aligned with the axis X of rotation of the rotating body 106. In some instances, the power transfer device 804 and the power receiver 806 may be configured to transfer electrical power ranging from about 15 watts to about 60 watts, or from about 20 watts to about 50 watts, or from about 30 watts to about 40 watts.

It should be noted that, although the inductive coupling shown in FIGS. 8A-8C includes inductive coils 808 and 810, other forms of inductive couplings are contemplated, such as, for example, near-field power transfer devices and far-field power transfer devices. In some instances, the inductive coupling may include resonant inductive coupling, non-resonant inductive coupling, capacitive coupling, resonant capacitive coupling, magnetodynamic coupling, a rotary transformer, and/or coupling via radio waves, microwaves, and/or light waves.

It should further be noted that, although the example of FIGS. 8A-8C illustrates each of the first data transmitter 122, the first data receiver 124, the second data transmitter 128, and the second data receiver 130 being radially offset from the axis of rotation X of the rotating body 106 (similar to the interface 102), in other instances, one or more of the first data transmitter 122, the first data receiver 124, the second data transmitter 128, and the second data receiver 130 may be placed at other locations on the rotating body 106 and the non-rotating body 104. For instance, each of the first data transmitter 122, the first data receiver 124, the second data transmitter 128, and the second data receiver 130 may be placed as shown in the example interface 202, the example interface 302, the example interface 402, the example interface 502, the example interface 602, and/or the example interface 702.

The example assemblies 100 shown in FIGS. 1A-8C may be incorporated into a sensor assembly. For example, FIGS. 9-13 schematically depict an example sensor assembly 900 configured to generate sensor data in the form of data signals, and transmit the data signals from the sensor assembly 900 to one or more processors for use of the data signals. For instance, as shown in FIGS. 9-13, the example sensor assembly 900 includes a spine 902 configured to couple the sensor assembly 900 to a platform, such as, for example, a vehicle for which the sensor signals may be used.

Figure 9:
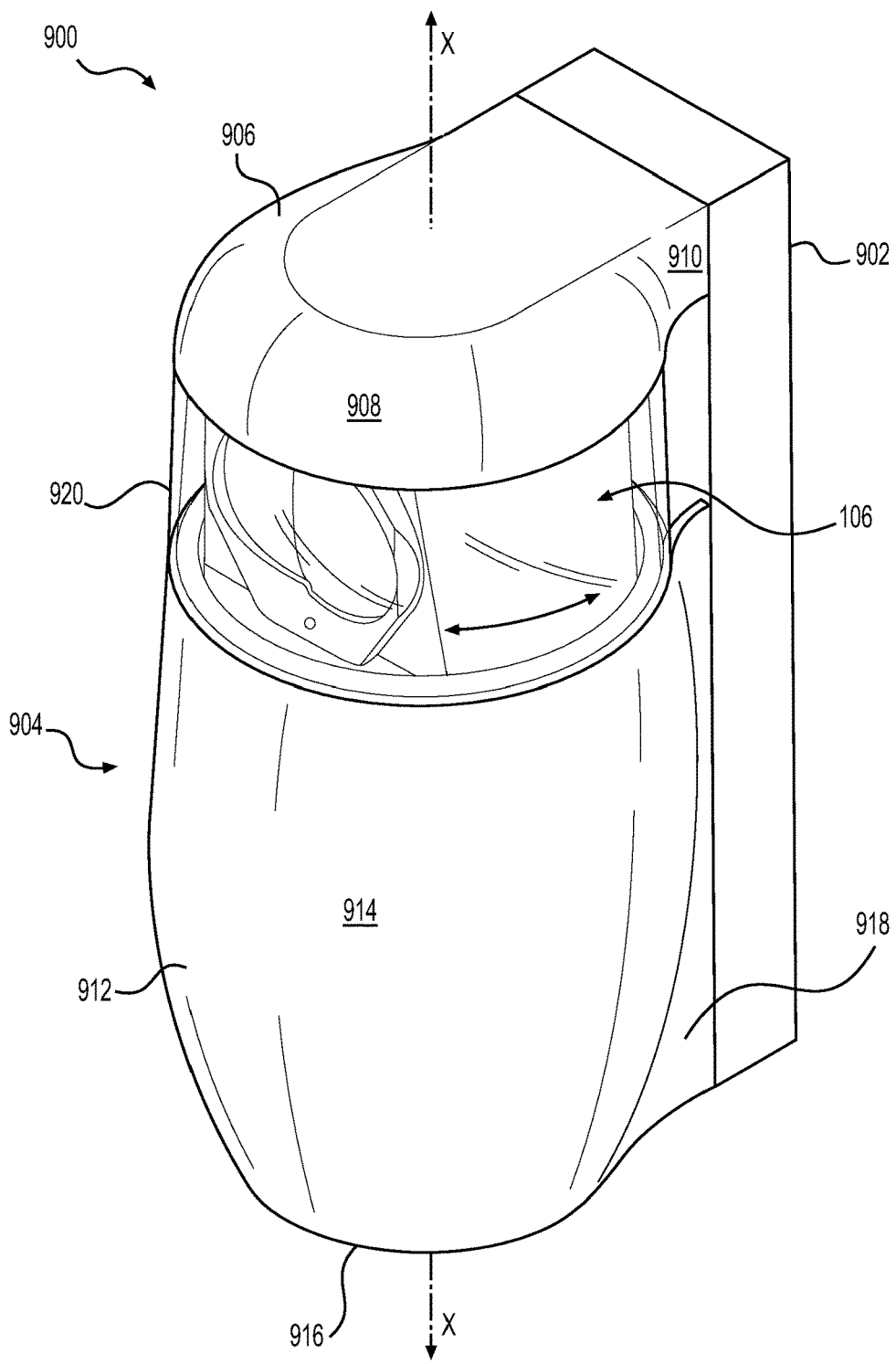
FIG. 9 is a schematic perspective view of an example sensor assembly.

In some instances, referring to FIG. 9, the sensor assembly 900 may include a protective casing 904 providing a housing configured to protect the sensor assembly 900 from environmental elements and/or provide a specified design appearance. In some instances, the protective casing 904 may be substantially cylindrical. As shown in FIG. 9, the example protective casing 904 includes a first shell portion 906 coupled to the support 110 and/or the spine 902 (see FIG. 10). The example first shell portion 906 includes a hat-shaped portion 908 configured to cover an upper end (i.e., in the orientation depicted) of the rotating body 106 of the sensor assembly 900, and an extension 910 configured to extend to the spine 902. The example protective casing 904 also includes a second shell portion 912 coupled to a third support (see FIG. 13) and/or the spine 902. The example second shell portion 912 includes a hollow cylindrical portion 914 having a closed end 916 and an open side 918 configured to fit around the rotating body 106 of the sensor assembly 900.

The example protective casing 904 also includes a lens 920 coupled to the spine 902 and the first shell portion 906 and second shell portion 912. The example lens 920 is ring-shaped and facilitates the passage of light to and from the sensor assembly 900 as the rotating body 106 of the sensor assembly 900 rotates within the protective casing 904. One or more O-rings (not shown) may be provided between the first shell portion 906 and the lens 920, and/or between the lens 920 and the second shell portion 912, where the first shell portion 906, the lens 920, and the second shell portion 912 meet one another in order to prevent dirt and moisture from entering the protective casing 904. Gaskets and/or sealants may be provided between one or more of the first shell portion 906, the lens 920, and the second shell portion 912, and the spine 902 in order to prevent dirt and moisture from entering the protective casing 904.

Figure 10:
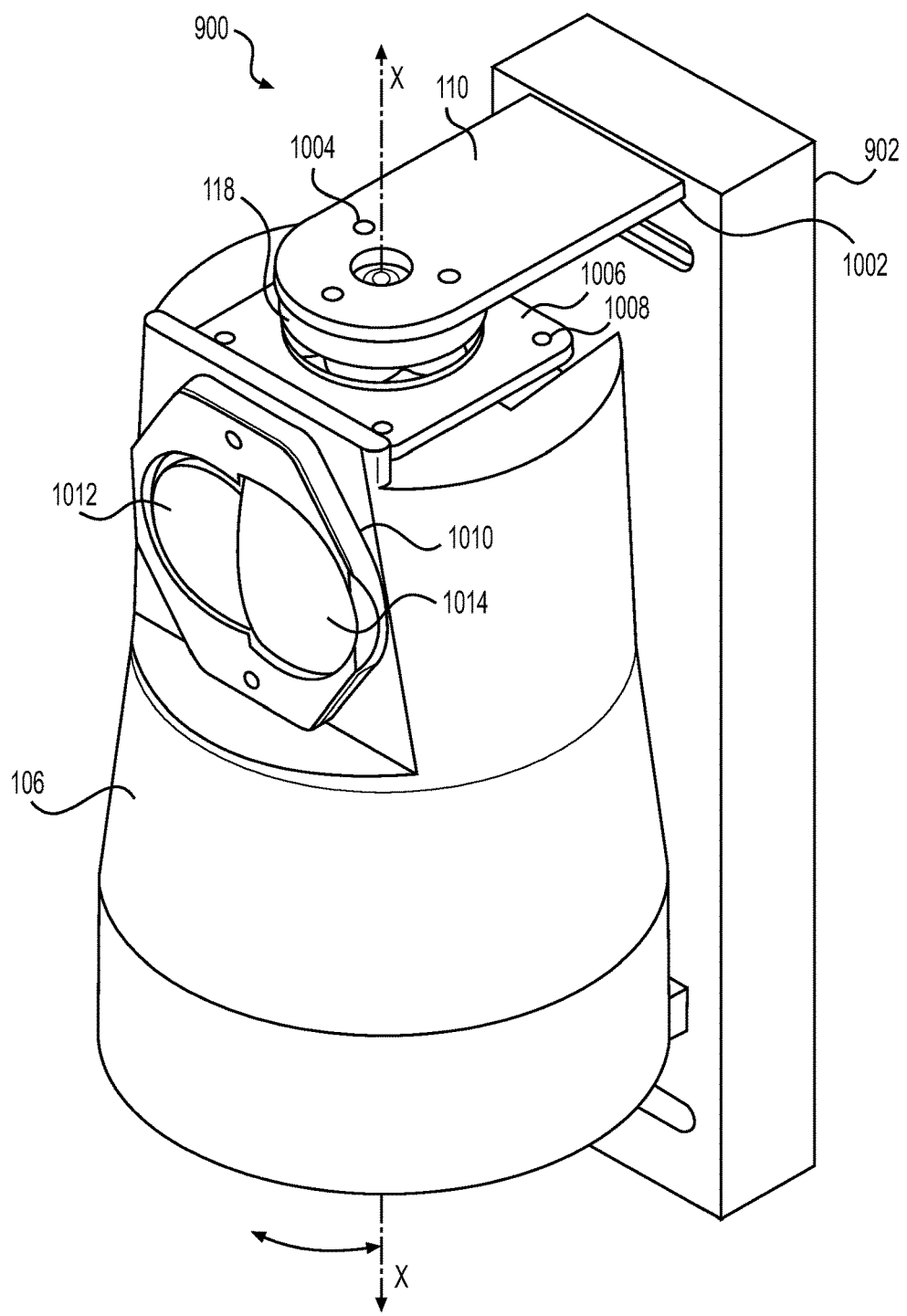
FIG. 10 is a schematic perspective view of a portion of the example sensor assembly shown in FIG. 9.

As shown in FIG. 10 the sensor assembly also includes the support 110 coupled to the spine 902, for example, in a cantilever configuration. In some instances, the support 110 and the spine 902 may be integrally formed via, for example, a single piece of material, thereby coupling the support 110 and the spine 902 to one another. In some instances, the spine 902 may include a slot 1002 in which an end of the support 110 is received. Fasteners, welds, and/or adhesives may be used to secure the support 110 in the slot 1002. The example sensor assembly 900 also includes the motor 118 coupled to the support 110, for example, via one or more fasteners 1004. The motor 118, in turn, is coupled to a rotating body 106 of the sensor assembly 900 via a coupler 1006 and one or more fasteners 1008. The coupler 1006 is configured to transfer torque from the motor 118 to the rotating body 106, so that the rotating body 106 rotates about its axis of rotation X.

In the example sensor assembly 900 shown, the rotating body 106 body serves as a substantially hollow housing for carrying electronic devices including components of the LIDAR sensors. For example, the rotating body 106 may carry one or more of laser boards 1102 (see FIG. 11) configured to emit laser light, a detector board (not shown) for detecting the return laser signals reflected from an object in the environment surrounding the sensor assembly 900, and one or more reflectors (not shown) configured to deflect the emitted laser light and/or the return signals, and electronic circuitry (not shown) to provide electrical power and control for operation of the sensor assembly 900. In addition, the example sensor assembly 900 also includes a lens housing 1010 configured to couple two lenses 1012 and 1014 to the rotating body 106. The lenses 1012 and 1014 are configured to focus the emitted laser light and the return signals for detecting objects in the environment surrounding the sensor assembly 900.

Figure 11:
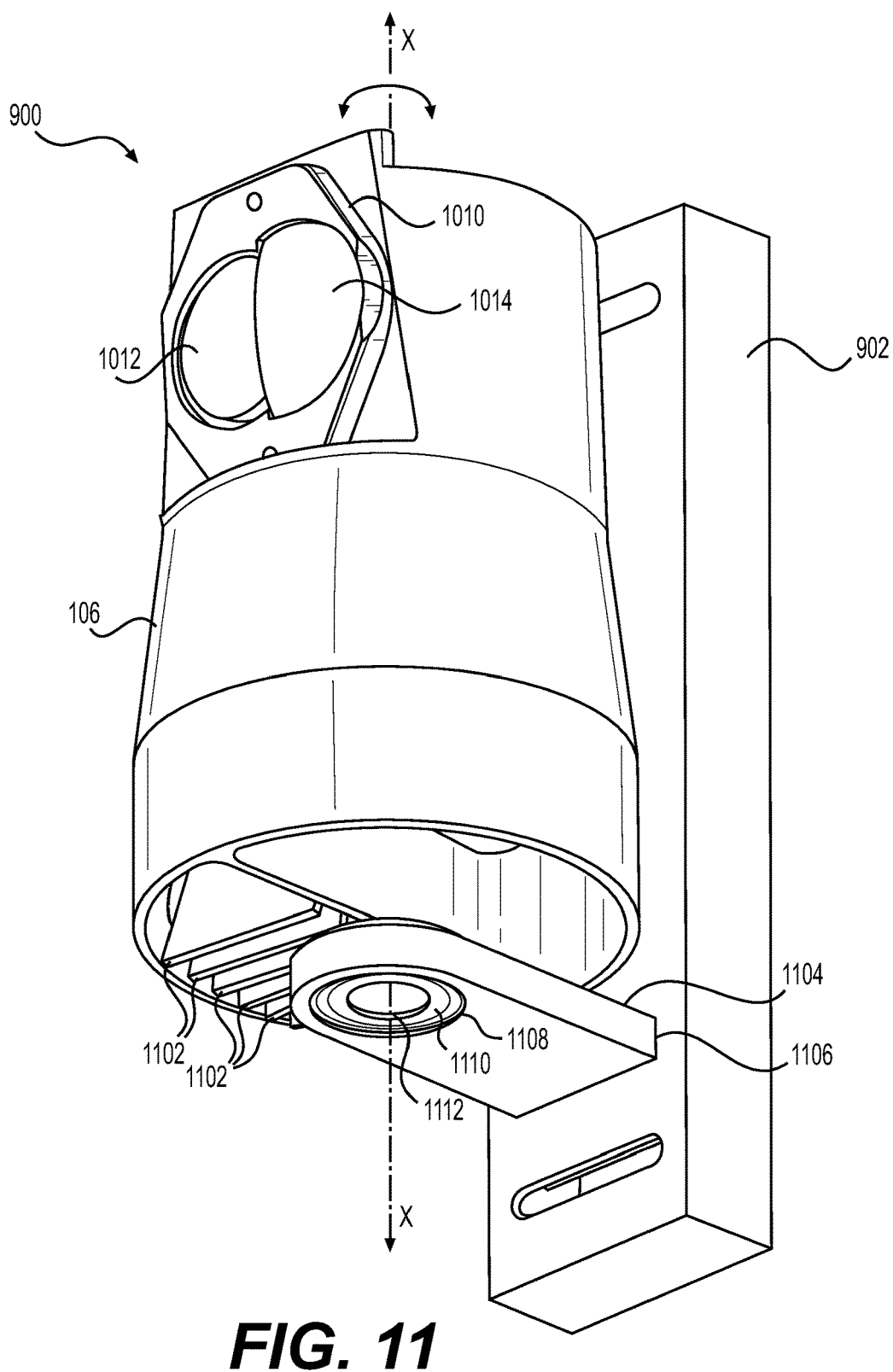
FIG. 11 is a schematic perspective view of a portion of the example sensor assembly shown in FIG. 9 shown from a different angle.

As shown in FIG. 11, the example sensor assembly 900 also includes a second support 1104 coupled to the spine 902, for example, in a cantilever manner. In some instances, the second support 1104 and the spine 902 may be integrally formed via, for example, a single piece of material, thereby coupling the second support 1104 and the spine 902 to one another. In some instances, the spine 902 includes a second slot 1106 in which the second support 1104 is received. Fasteners, welds, and/or adhesives may be used to secure the second support 1104 in the second slot 1106. The example second support 1104 may include a bore 1108 receiving a bearing 1110, and the rotating body 106 may include a stub 1112 coupled to the bearing 1110, such that the stub 1112 and the rotating body 106 rotate with the bearing 1110. In the example shown, the support 110, the bearing 1110, the motor 118, the second support 1104, and bearing 1110 facilitate rotation of the rotating body 106 about the axis of rotation X As a result of this example configuration, the laser light emitted from the sensor assembly 900 may be directed through a 360-degree sweep of the surrounding environment for detection of objects in the surrounding environment (not including the portion of the 360-degrees blocked by the spine 902).

Figure 12:
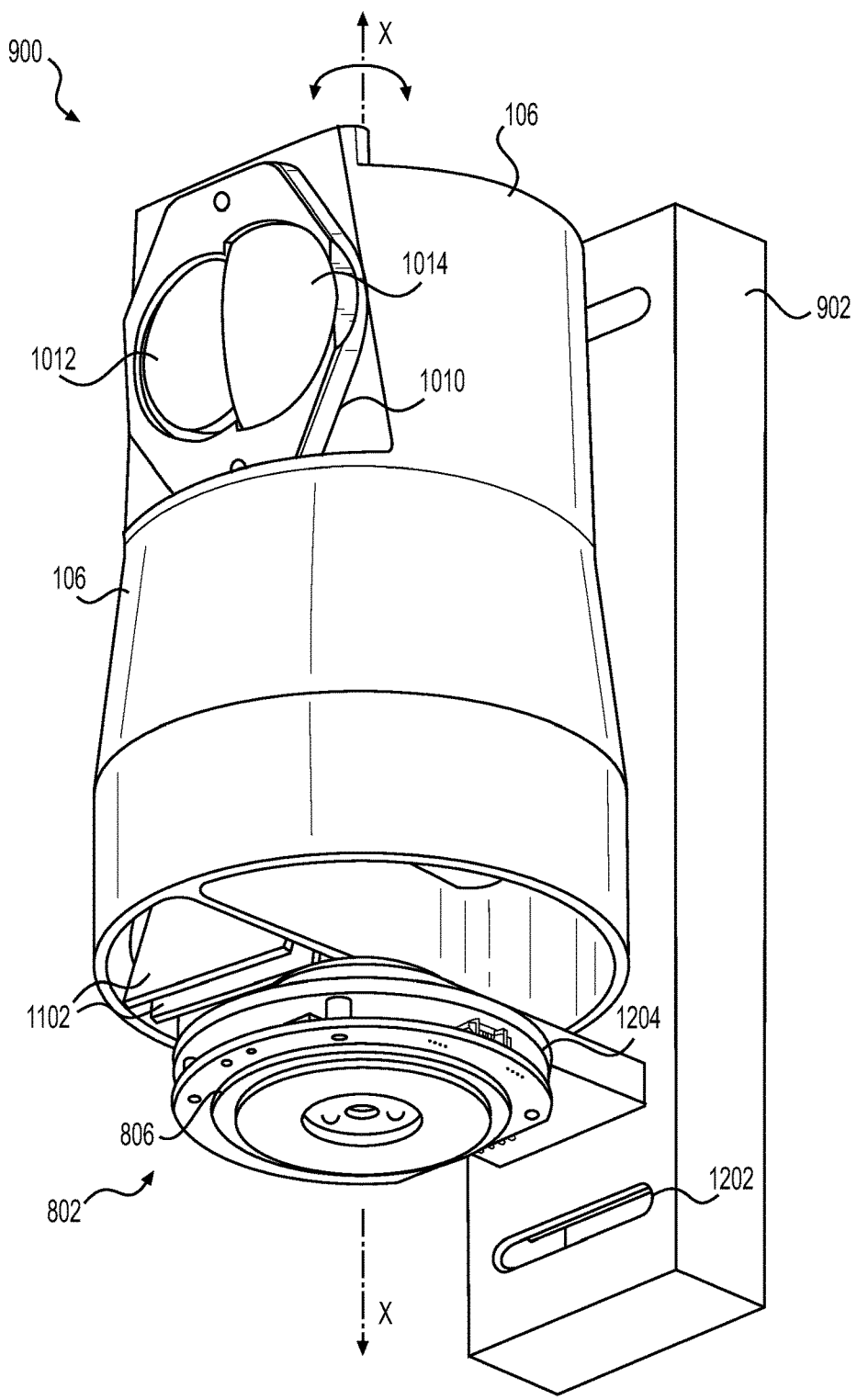
FIG. 12 is a schematic perspective view of a portion of the example sensor assembly shown in FIG. 9, including a portion of an example interface, shown from the same angle as FIG. 11.
Figure 13:
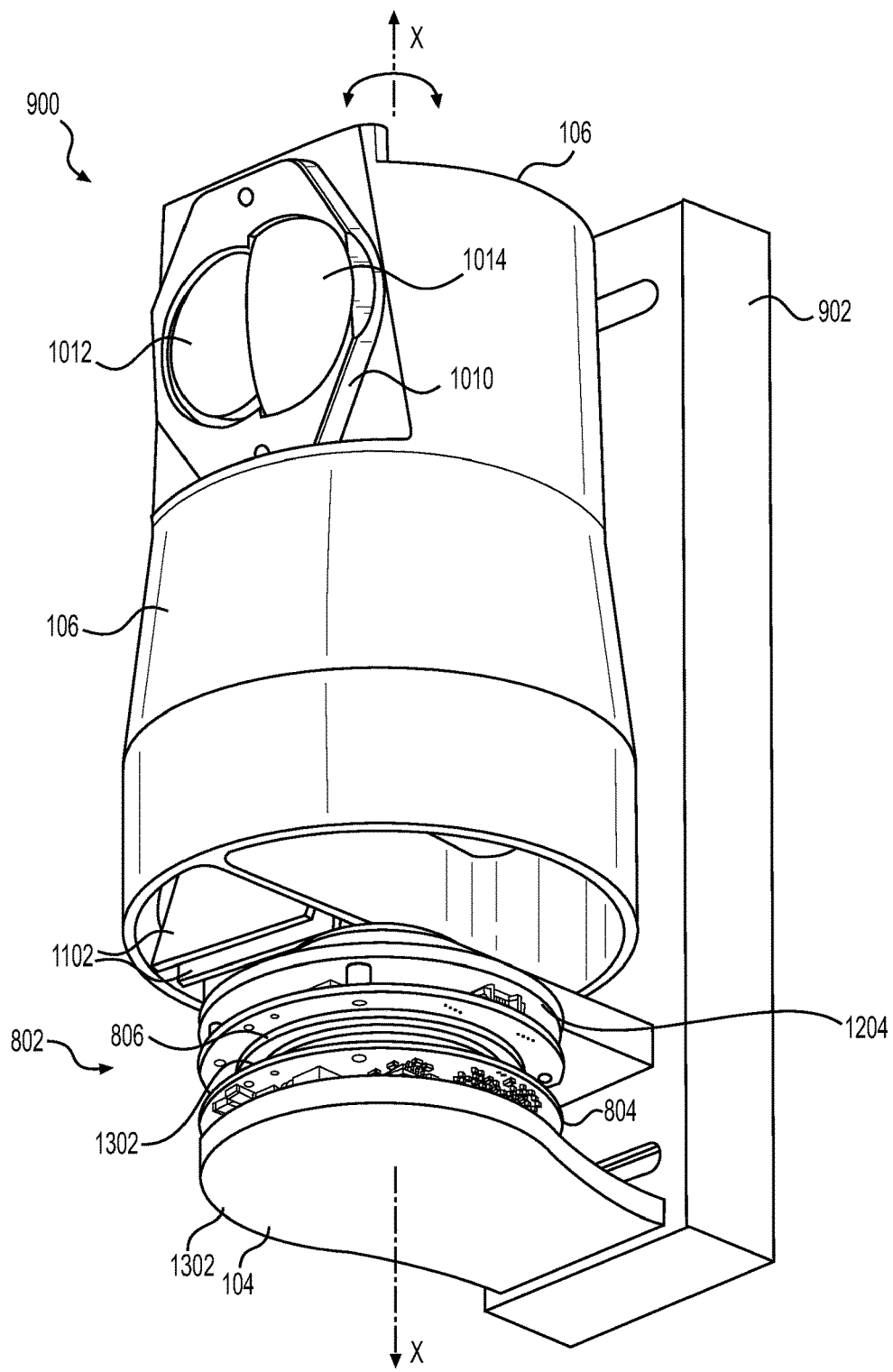
FIG. 13 is a schematic perspective view of a portion of the example sensor assembly shown in FIG. 9, including the example interface shown from the same angle as FIG. 11.

As shown in FIGS. 12 and 13, the example sensor assembly 900 includes an interface 802 for transferring power and data between a non-rotating body 104 and the rotating body 106. For example, as shown in FIG. 13, the example sensor assembly 900 includes a non-rotating body 104 in the form of the third support 1302 coupled to the spine 902, for example, in a cantilever manner. For example, the spine 902 includes a third slot 1202 (see FIG. 12), in which the third support 1302 is received. Fasteners, welds, and/or adhesives may be used to secure the third support 1302 in the third slot 1202. The spine 902 may be coupled to, for example, a vehicle that uses the sensor assembly 900 to detect objects surrounding the vehicle. For example, the spine 902 and/or the third support 1302 may provide a conduit for routing fiber optics, wires, and/or cables between the third support 1302 and control and/or power systems of the vehicle.

In some instances, a power system of the vehicle may supply electric power to the wires and/or cables received by the spine 902 and/or the third support 1302. In some instances, a control system of the vehicle may provide control signals to the fiber optics, wires, and/or cables received by the spine 902 and/or the third support 1302. In some instances, the data signals received by the fiber optics, wires, and/or cables of the third support 1302 from the rotating body 106, may be supplied to the control systems of the vehicle by the fiber optics, wires, and/or cables. In this example manner, electrical power may be supplied via fiber optics, wires, and/or cables of the third support 1302, data signals may be supplied from the vehicle to the third support 1302, and/or data signals from the rotating body 106 of the sensor assembly 900 may be supplied via the third support 1302 to the control systems of the vehicle.

As shown in FIGS. 12 and 13, the example interface 802 includes a power transfer device 804 coupled to the third support 1302 (see FIG. 13) and configured to transfer electrical power, and a power receiver 806 (see FIGS. 12 and 13) coupled to the rotating body 106 and configured to receive electrical power from the power transfer device 804 via a wireless coupling. The example interface 802 also includes the first data transmitter 122 (FIG. 12) coupled to the rotating body 106 of the sensor assembly 900 and configured to transmit the first data signals, and the first data receiver 124 coupled to the third support 1302 and configured to receive the first data signals from the first data transmitter 122 via a first wireless coupling. Furthermore, the example interface 802 includes the second data transmitter 128 coupled to the third support 1302 and configured to transmit second data signals, and the second data receiver 130 (FIG. 12) coupled to the rotating body 106 of the sensory assembly and configured to receive the second data signals from the second data transmitter 128 via a second wireless coupling.

In the example shown in FIGS. 12 and 13, the power transfer device 804 and the power receiver 806 each include an inductive coil, and the wireless coupling between the power transfer device 804 and the power receiver 806 provides an inductive coupling. In some instances, the power receiver 806 is coupled to the rotating body 106 of the sensor assembly 900 by a coupling plate 1204, for example, as shown in FIGS. 12 and 13. The example coupling plate 1204 may be coupled to the bearing 1110 associated with the second support 1104, for example, so that the coupling plate 1204 is on a side of the second support 1104 opposite the rotating body 106 of the sensor assembly 900, with the power receiver 806 being on a side of the coupling plate 1204 opposite the second support 1104, for example, as shown in FIG. 12.

In the example shown, the power transfer device 804 and the power receiver 806 are axially aligned with the axis of rotation X of the rotating body 106, and thus, the respective inductive coils of the power transfer device 804 and the power receiver 806 are axially aligned with one another. The example power transfer device 804 and the power receiver 806 also include electronic circuitry, for example, in the form of programmable circuit boards, configured to control operation of the inductive coils. In this example configuration, electrical power may be transmitted wirelessly via induction from a power source associated with the vehicle to the electrically powered devices carried by the rotating body 106. In some instances, the power transfer device 804 and the power receiver 806 may be a near-field transfer device. In some instances, the power transfer device 804 and the power receiver 806 may be configured to transfer electrical power ranging from about 15 watts to about 60 watts, or from about 20 watts to about 50 watts, or from about 30 watts to about 40 watts.

The example first data transmitter 122 shown in FIG. 12 is configured to send the first data signals relating to sensor data from the rotating body 106 of the sensor assembly 900 to the first data receiver 124. For example, the first sensor signals in the form of data signals from the LIDAR sensors may be wirelessly transmitted by the first data transmitter 122 to the first data receiver 124, so that the first data signals may be transmitted from the sensor assembly 900 to one or more controllers of the vehicle. In some instances, the first data transmitter 122 and the first data receiver 124 may be configured to wirelessly transfer the first data signals via a high-speed wireless link (e.g., a wireless link having a data transfer rate of greater than or equal to 50 kbps). In some instances, the first data transmitter 122 and the first data receiver 124 may be configured to provide uni-directional data transfer.

In some instances, the first data transmitter 122 and the first data receiver 124 may each include an optical communication device, and the first wireless coupling between the first data transmitter 122 and the first data receiver 124 provides a first optical coupling. For instance, the first optical coupling may be a free-space optical coupling. As discussed above, in some instances, the first data transmitter 122 may include a first optical transmitter, such as, for example, a LED, a laser diode (e.g., vertical-cavity surface-emitting laser), or the like, and the first data receiver 124 may include a first optical receiver, such as a photodetector (e.g., semiconductor-based photodiode, metal-semiconductor-metal photodetector, etc.). In some instances, the first data transmitter 122 and the first data receiver 124 may be transceivers configured to both transmit data and receive data. In some instances, an optical transmission between the first data transmitter 122 and the first data receiver 124 may include visible light and/or invisible light (e.g., infrared light). Other types of high-speed wireless links are contemplated.

The example interface 802 also includes the second data transmitter 128 coupled to the third support 1302 and configured to transmit the second data signals, and the second data receiver 130 coupled to the rotating body 106 of the sensor assembly 900 and configured to receive the second data signals from the second data transmitter 128 via a second wireless coupling. In some instances, the second data transmitter 128 is configured to send the second data signals for regulating power supplied to the electronic devices including components of the LIDAR sensors carried by the rotating body 106 to the second data receiver 130. In some instances, the second data transmitter 128 is configured to send the second data signals for controlling operation of the rotating body 106 of the sensor assembly 900 to the second data receiver 130, such as, for example, control signals related to controlling rotation of the rotating body 106 of the sensor assembly 900 via control of the motor 118, updates to software (e.g. firmware) of the electronics contained in the rotating body 106, or the like.

In some instances, the second data transmitter 128 and the second data receiver 130 may each include an optical communication device, and the second wireless coupling between the second data transmitter 128 and the second data receiver 130 provides a second optical coupling. For instance, the first optical coupling may be a free-space optical coupling. As discussed above, in some instances, the second data transmitter 128 may include a second optical transmitter, such as, for example, a LED, a laser diode (e.g., vertical-cavity surface-emitting laser), or the like, and the second data receiver 130 may include a second optical receiver, such as a photodetector (e.g., semiconductor-based photodiode, metal-semiconductor-metal photodetector, etc.). In some instances, the second data transmitter 128 and the second data receiver 130 may be transceivers configured to both transmit data and receive data. In some instances, an optical transmission between the second data transmitter 128 and the second data receiver 130 may include visible light and/or invisible light (e.g., infrared light). Other types of high-speed wireless links are contemplated.

It should be noted that, although the example of FIGS. 9-13 illustrate the sensor assembly 900 including the example interface 802, in other instances, the sensor assembly 900 may include the example interface 202, the example interface 302, the example interface 402, the example interface 502, the example interface 602, and/or the example interface 702.

Figure 14:
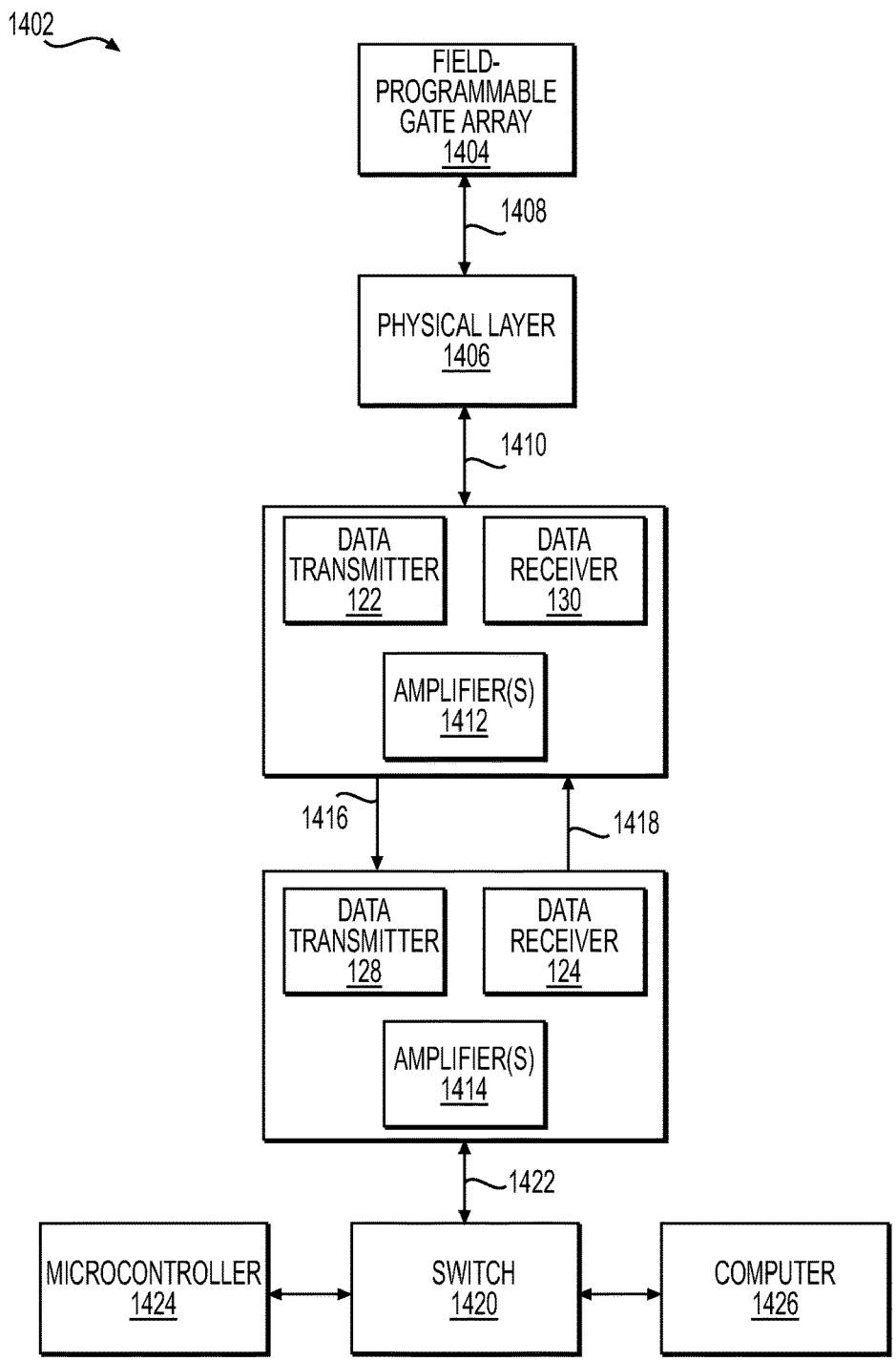
FIG. 14 illustrates a block diagram of an example system for tunneling a protocol when transmitting data signals between a rotating body and a non-rotating body.

FIG. 14 illustrates a block diagram of an example system 1402 for tunneling a protocol when transmitting data signals between the rotating body 106 and the non-rotating body 104. As shown, the system 1402 includes a field-programmable gate array (FPGA) 1404 and a physical layer (PHY) 1406, which may each be associated with (e.g., placed within) the rotating body 106. In some instances, the FPGA 1408 may send/receive data 1408 with the PHY 1406 and the PHY 1406 may receive/send data 1410 (which may be similar to the data 1408) with the first data transmitter 122, the second data receiver 130, and/or the amplifier(s) 1412 without requiring the data 1408 and/or the data 1410 to be encoded/decoded. For instance, system 1402 may use a protocol (e.g., Ethernet, etc.), and devices may communicate in a way that does not require encoding (e.g., the data 1408 and the data 1410 may include Ethernet data packets).

The amplifier(s) 1412, as well as the amplifier(s) 1414, may include one or more amplifiers, such as limiting amplifiers. For instance, a first limiting amplifier 1414 may attenuate the first data signals 1416 received by the first data receiver 124 that are above a first threshold frequency and/or below a second threshold frequency, and a second limiting amplifier 1412 may attenuate the second data signals 1418 received by the second data receiver 130 that are above a third threshold frequency and/or below a fourth threshold frequency. In some instances, the first threshold frequency can include substantially the same frequency (e.g., within a threshold deviation, such as 1%, 2%, 5%, or the like) as the third threshold frequency and/or the second threshold frequency can include substantially the same frequency (e.g., within a threshold deviation, such as 1%, 2%, 5%, or the like) as the fourth threshold frequency. Additionally, or alternatively, in some instances, the first threshold frequency can be different than the third threshold frequency and/or the second threshold frequency can be different than the fourth threshold frequency.

The system 1402 further includes a switch 1420 that splits the data 1422 output by the first data receiver 124 and/or the amplifier(s) 1414 to a microcontroller 1424 and a computer 1426, and also sends data 1422 received from each of the microcontroller 1424 and the computer 1426 to the second data transmitter 128. The microcontroller 1424 can perform axially tasks on the non-rotating side, such as motor control for a vehicle. Each of the switch 1420, the microcontroller 1424, and the computer 1426 may be associated with (e.g., placed within) the non-rotating body. In some instances, the components in the non-rotating body (e.g., the switch 1420, the microcontroller 1424, and the computer 1426) may use a similar Protocol as the components in the rotating body. For instance, the data 1422 may include Ethernet data packets.

Figure 15:
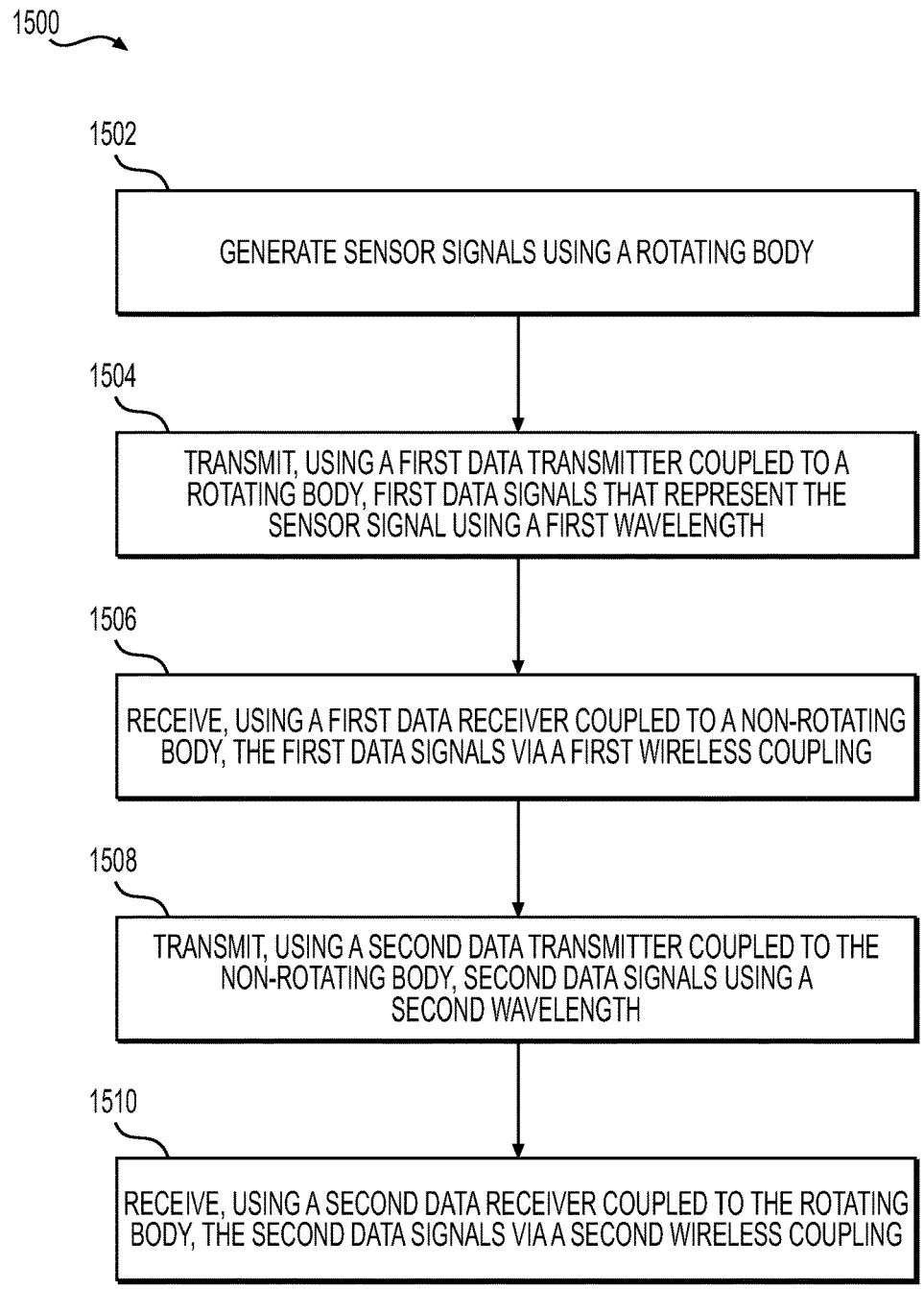
FIG. 15 illustrates a flow diagram of an example process of transferring data signals between a rotating body and a non-rotating body.

FIG. 15 illustrates a flow diagram of an example process 1500 for transferring data signals between a rotating body and a non-rotating body. The process 1500 is illustrated as collections of blocks in logical flow diagrams, which represent a sequence of operations, some or all of which can be implemented in hardware, software or a combination thereof. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

At 1502, the process 1500 generates sensor signals using a rotating body. For instance, a rotating body may carry one or more sensors configured to generate the sensor signals. A non-rotating body may define a substantially planar surface, and an axis of rotation of the rotating body may be substantially perpendicular to the planar surface. For instance, the axis of rotation of the rotating body may be perpendicular to the planar surface within technical tolerances. In some instances, the axis of rotation of the rotating body may be orthogonal to the planar surface. In some examples, the rotating body may have a second planar surface which is substantially parallel to the planar surface throughout any amount of rotation. Additionally, in some instances, the non-rotating body and the rotating body may be coupled to one another.

At 1504, the process 1500 transmits, using a first data transmitter coupled to a rotating body, first data signals that represent the sensor signals using a first wavelength and at 1506, the process 1500 receives, using a first data receiver coupled to a non-rotating body, the first data signals via a first wireless coupling. For instance, the first data transmitter may include a first optical transmitter that emits first light representing the first data signals, where the first light includes a first wavelength. The first data receiver may include a first optical receiver that receives the first light from the first optical transmitter via a first optical coupling.

At 1508, the process 1500 transmits, using a second data transmitter coupled to the non-rotating body, second data signals using a second wavelength and at 1510, the process 1500 receives, using a second data receiver coupled to the rotating body, the second data signals via a second wireless coupling. For instance, the second data transmitter may include a second optical transmitter that emits second light representing the second data signals, where the second light includes a second wavelength. In some instances, the second wavelength includes a different wavelength than the first wavelength. The second data receiver may include a second optical receiver that receives the second light from the second optical transmitter via a second optical coupling.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

EXAMPLE CLAUSES

A: A sensor assembly comprising: a rotating body; a non-rotating body positioned adjacent to the rotating body such that the rotating body rotates about an axis of rotation that passes through the non-rotating body; a first data transmitter coupled to the rotating body and configured to transmit first data signals; a first data receiver coupled to the non-rotating body and configured to receive the first data signals; a second data transmitter coupled to the non-rotating body and configured to transmit second data signals; and a second data receiver coupled to the rotating body and configured to receive the second data signals.

B: The sensor assembly as paragraph A recites, wherein: the first data transmitter transmits the first data signals at a first wavelength; the second data transmitter transmits the second data signals at a second wavelength; and the first wavelength is different than the second wavelength.

C: The sensor assembly as either paragraph A or paragraph B recites, wherein: the rotating body includes at least one sensor configured to generate sensor signals; and the first data signals represent the sensor signals.

D: The sensor assembly as any of paragraphs A-C recite, wherein: the first data transmitter comprises a first optical transmitter; the first data receiver comprises a first optical receiver; the second data transmitter comprises a second optical transmitter; and the second data receiver comprises a second optical receiver.

E: The sensor assembly as any of paragraphs A-C recite, wherein: the first data transmitter and the first data receiver are offset from the axis of rotation; and the second data transmitter and the second data receiver are offset from the axis of rotation.

F: The sensor assembly as any of paragraphs A-C recite, wherein at least one of: the first data transmitter and the first data receiver are aligned with the axis of rotation, and the second data transmitter and the second data receiver are offset from the axis of rotation; or the first data transmitter and the first data receiver are offset from the axis of rotation, and the second data transmitter and the second data receiver are aligned with the axis of rotation.

G: The sensor assembly as any of paragraphs A-C recite, wherein: the first data receiver and the second data receiver are aligned with the axis of rotation; and the first data transmitter and the second data transmitter are offset from the axis of rotation.

H: The sensor assembly as any of paragraphs A-C recite, wherein: the first data transmitter and the second data transmitter are aligned with the axis of rotations; the first data transmitter comprises a first optical transmitter configured to emit first light that represents the first data signals; the second data transmitter comprises a second optical transmitter configured to emit second light that represents the second data signals; and the sensor assembly further comprises: a first beam splitter coupled to the non-rotating body and configured to reflect at least a portion of the first light toward the first data receiver and transmit at least a portion of the second light from the second data transmitter; and a second beam splitter coupled to the rotating body and configured to reflect at least a portion of the second light toward the second data receiver and transmit at least a portion of the light from the first data transmitter, wherein the first beam splitter and the second beam splitter are aligned along the axis of rotation.

I: The sensor assembly as any of paragraphs A and C-H recite, wherein: the first data transmitter comprises at least a first light emitting component that emits first light at a first wavelength and a second light emitting component that emits second light at a second wavelength; and the second data transmitter comprises at least a third light emitting component that emits third light at a third wavelength and a fourth light emitting component that emits fourth light at a fourth wavelength.

J: The sensor assembly as any of paragraphs A-I recite, further comprising: a first limiter configured to attenuate at least one first data signal, from the first data signals received by the first data receiver, that is above a first threshold frequency or below a second threshold frequency; and a second limiter configured to attenuate at least one second data signal, from the second data signals received by the second data receiver, that is above a third threshold frequency and below a fourth threshold frequency.

K: The sensor assembly as any of paragraphs A-J recite, further comprising: a switch coupled to the non-rotating body and configured to receive first data representing the first data signals from the first data receiver; a microcontroller coupled to the non-rotating body and configured to receive the first data from the switch; a computer coupled to the non-rotating body and configured to receive the first data from the switch; a physical layer coupled to the rotating body and configured to receive second data representing the second data signals from the second data receiver; and a field-programmable gate array coupled to the rotating body and configured to receive the second data from the physical layer.

L: An interface for transferring data between a non-rotating body and a rotating body having an axis of rotation, the interface comprising: a first data transmitter coupled to the rotating body and configured to transmit first data signals; a first data receiver coupled to the non-rotating body and configured to receive the first data signals from the first data transmitter; a second data transmitter coupled to the non-rotating body and configured to transmit second data signals; and a second data receiver coupled to the rotating body and configured to receive the second data signals from the second data transmitter.

M: The interface as paragraph L recites, wherein: the first data transmitter is configured to transmit the first data signals at a first wavelength; the second data transmitter is further configured to transmit the second data signals at a second wavelength; and the first wavelength is different than the second wavelength.

N: The interface as either paragraph L or paragraph M recites, wherein: the first data transmitter is configured to send, to the first data receiver, the first data signals relating to sensor data from a sensor disposed on the rotating body; and the second data transmitter is configured to send, to the second data receiver, the second data signals for controlling an operation of the rotating body.

O: The interface as any of paragraphs L-N recite, wherein at least one of: the first data transmitter and the first data receiver are aligned with the axis of rotation; the first data transmitter and the first data receiver are offset from the axis of rotation; the second data transmitter and the second data receiver are aligned with the axis of rotation; or the second data transmitter and the second data receiver are offset from the axis of rotation.

P: The interface as any of paragraphs L-O recite, wherein: the first data transmitter comprises a first optical transmitter configured to emit first light that represents the first data signals and the second data transmitter comprises a second optical transmitter configured to emit second light that represents the second data signals, and wherein the interface further comprises: a first beam splitter coupled to the non-rotating body and configured to reflect at least a portion of the first light toward the first data receiver and transmit at least a portion of the second light; and a second beam splitter coupled to the rotating body and configured to reflect at least a portion of the second light toward the second data receiver and transmit at least a portion of the first light.

Q: The interface as paragraph P recites, wherein the first light is emitted at a first wavelength and the second light is emitted at a second wavelength, and wherein the interface further comprises: a first coating disposed on the first beam splitter, wherein the first coating is configured to reflect a greater amount of light at the first wavelength than light at the second wavelength; and a second coating disposed on the second beam splitter, wherein the second coating is configured to reflect a greater amount of light at the second wavelength than light at the first wavelength.

R: A method comprising: generating sensor signals from one or more sensors disposed about a rotating body of a sensor assembly, wherein the rotating body is configured to rotate about an axis of rotation that passes through a non-rotating body of the sensor assembly; transmitting, using a first data transmitter coupled to the rotating body, first data signals that represent the sensor signals; receiving, using a first data receiver coupled to the non-rotating body, the first data signals; transmitting, using a second data transmitter coupled to the non-rotating body, second data signals; and receiving, using a second data receiver coupled to the rotating body, the second data signals.

S: The method as paragraph R recites, wherein: the first data transmitter transits the first data signals at a first wavelength; the second data transmitter transmits the second data signals at a second wavelength; and the first wavelength is different than the second wavelength.

T: The method as either paragraph R or paragraph S recites, further comprising: sending, via the first data receiver, and using a protocol, first data representing the first data signals to a switch; sending, by the switch, the first data to at least one of a microcontroller or a computer; and sending, via the second data receiver, and using the protocol, second data representing the second data signals to at least one of a field-programmable gate array or a physical layer.

What is claimed is:

1. A sensor assembly comprising:
   a rotating body;
   a non-rotating body positioned adjacent to the rotating body such that the rotating body rotates about an axis of rotation that passes through the non-rotating body;
   a first optical transmitter coupled to the rotating body and configured to transmit first light representing first data signals;
   a first optical receiver coupled to the non-rotating body and configured to receive the first light representing the first data signals;
   a second optical transmitter coupled to the non-rotating body and configured to transmit second light representing second data signals;
   a second optical receiver coupled to the rotating body and configured to receive the second light representing the second data signals;
   a first beam splitter coupled to the non-rotating body and configured to reflect at least a portion of the first light toward the first optical receiver and transmit at least a portion of the second light from the second optical transmitter; and
   a second beam splitter coupled to the rotating body and configured to reflect at least a portion of the second light toward the second optical receiver and transmit at least a portion of the first light from the first optical transmitter.

2. The sensor assembly as recited in claim 1, wherein:
   the first optical transmitter transmits the first light at a first wavelength;
   the second optical transmitter transmits the second light at a second wavelength; and
   the first wavelength is different than the second wavelength.

3. The sensor assembly as recited in claim 1, wherein:
   the rotating body includes at least one sensor configured to generate sensor signals; and
   the first data signals represent the sensor signals.

4. The sensor assembly as recited in claim 1, wherein:
   the first optical transmitter and the first optical receiver are offset from the axis of rotation; and
   the second optical transmitter and the second optical receiver are offset from the axis of rotation.

5. The sensor assembly as recited in claim 1, wherein at least one of:
   the first optical transmitter and the first optical receiver are aligned with the axis of rotation, and the second optical transmitter and the second optical receiver are offset from the axis of rotation; or
   the first optical transmitter and the first optical receiver are offset from the axis of rotation, and the second optical transmitter and the second optical receiver are aligned with the axis of rotation.

6. The sensor assembly as recited in claim 1, wherein:
   the first optical receiver and the second optical receiver are aligned with the axis of rotation; and
   the first optical transmitter and the second optical transmitter are offset from the axis of rotation.

7. The sensor assembly as recited in claim 1, wherein:
   the first optical transmitter comprises at least a first light emitting component that emits the first light at a first wavelength and a second light emitting component that emits third light at a second wavelength; and
   the second optical transmitter comprises at least a third light emitting component that emits the second light at a third wavelength and a fourth light emitting component that emits fourth light at a fourth wavelength.

8. The sensor assembly as recited in claim 1, further comprising:
   a switch coupled to the non-rotating body and configured to receive first data representing the first data signals from the first optical receiver;
   a microcontroller coupled to the non-rotating body and configured to receive the first data from the switch;
   a computer coupled to the non-rotating body and configured to receive the first data from the switch;
   a physical layer coupled to the rotating body and configured to receive second data representing the second data signals from the second optical receiver; and
   a field-programmable gate array coupled to the rotating body and configured to receive the second data from the physical layer.

9. An interface for transferring data between a non-rotating body and a rotating body having an axis of rotation, the interface comprising:
   a first data transmitter coupled to the rotating body and configured to emit first light representing first data signals;
   a first data receiver coupled to the non-rotating body and configured to receive the first light from the first data transmitter;
   a second data transmitter coupled to the non-rotating body and configured to emit second light representing second data signals;
   a second data receiver coupled to the rotating body and configured to receive the second light from the second data transmitter;
   a first beam splitter coupled to the non-rotating body and configured to reflect at least a portion of the first light toward the first data receiver and transmit at least a portion of the second light from the second data transmitter; and
   a second beam splitter coupled to the rotating body and configured to reflect at least a portion of the second light toward the second data receiver and transmit at least a portion of the first light from the first data transmitter.

10. The interface as recited in claim 9, wherein:
    the first data transmitter is configured to emit the first light at a first wavelength;
    the second data transmitter is configured to emit the second light at a second wavelength; and
    the first wavelength is different than the second wavelength.

11. The interface as recited in claim 9, wherein:
    the first data transmitter is configured to send, to the first data receiver, the first data signals relating to sensor data from a sensor disposed on the rotating body; and
    the second data transmitter is configured to send, to the second data receiver, the second data signals for controlling an operation of the rotating body.

12. The interface as recited in claim 9, wherein at least one of:
    the first data transmitter and the first data receiver are aligned with the axis of rotation;
    the first data transmitter and the first data receiver are offset from the axis of rotation;
    the second data transmitter and the second data receiver are aligned with the axis of rotation; or
    the second data transmitter and the second data receiver are offset from the axis of rotation.

13. The interface as recited in claim 9, wherein the first light is emitted at a first wavelength and the second light is emitted at a second wavelength, and wherein the interface further comprises:
- a first coating disposed on the first beam splitter, wherein the first coating is configured to reflect a greater amount of light at the first wavelength than light at the second wavelength; and
- a second coating disposed on the second beam splitter, wherein the second coating is configured to reflect a greater amount of light at the second wavelength than light at the first wavelength.

14. A method comprising:
- generating sensor signals from one or more sensors disposed about a rotating body of a sensor assembly, wherein the rotating body is configured to rotate about an axis of rotation that passes through a non-rotating body of the sensor assembly;
- emitting, using a first data transmitter coupled to the rotating body, first light that represents first data signals, the first data signals representing the sensor signals;
- receiving, using a first data receiver coupled to the non-rotating body, the first light;
- emitting, using a second data transmitter coupled to the non-rotating body, second light that represents second data signals;
- receiving, using a second data receiver coupled to the rotating body, the second data light;
- causing, using a first beam splitter coupled to the non-rotating body, at least a portion of the first light to be reflected toward the first data receiver; and
- causing, using a second beam splitter coupled to the rotating body, at least a portion of the second light to be reflected toward the second data.

15. The method as recited in claim 14, wherein:
the first data transmitter emits the first light at a first wavelength;
the second data transmitter emits the second light at a second wavelength; and
the first wavelength is different than the second wavelength.

16. The method as recited in claim 14, further comprising:
- sending, via the first data receiver, and using a protocol, first data representing the first data signals to a switch;
- sending, by the switch, the first data to at least one of a microcontroller or a computer; and
- sending, via the second data receiver, and using the protocol, second data representing the second data signals to at least one of a field-programmable gate array or a physical layer.

17. The interface as recited in claim 9, wherein the rotating body rotates about the axis of rotation.

18. The interface as recited in claim 9, wherein:
the second data receiver is offset from the axis of rotation; and
the second light diverges from the second data transmitter such that second data receiver receives the light during a rotation of the rotating body.

* * * * *